US011312489B2

(12) United States Patent
Skladman et al.

(10) Patent No.: US 11,312,489 B2
(45) Date of Patent: Apr. 26, 2022

(54) DEPLOYABLE EMERGENCY SITUATION AWARENESS SUPPORT SYSTEM

(71) Applicant: ISRAEL AEROSPACE INDUSTRIES LTD., Lod (IL)

(72) Inventors: Rami Skladman, Ra'anana (IL); Ron Bublitsky, Haifa (IL); Haim Korach, Tel Aviv (IL); Ben Keshales, Moshav Beit Ezra (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 262 days.

(21) Appl. No.: 16/313,684

(22) PCT Filed: Jun. 28, 2017

(86) PCT No.: PCT/IL2017/050720
§ 371 (c)(1),
(2) Date: Dec. 27, 2018

(87) PCT Pub. No.: WO2018/002928
PCT Pub. Date: Jan. 4, 2018

(65) Prior Publication Data
US 2019/0315462 A1 Oct. 17, 2019

(30) Foreign Application Priority Data
Jun. 30, 2016 (IL) .......................................... 246554

(51) Int. Cl.
*B64C 39/02* (2006.01)
*B64C 25/24* (2006.01)
(Continued)

(52) U.S. Cl.
CPC ............ *B64C 39/022* (2013.01); *B64C 25/24* (2013.01); *B64C 39/024* (2013.01); *B64D 3/00* (2013.01);
(Continued)

(58) Field of Classification Search
CPC ..... B64C 39/022; B64C 25/24; B64C 39/024; B64C 2201/082; B64C 2201/12;
(Continued)

(56) References Cited

U.S. PATENT DOCUMENTS 3,140,847 A 7/1964 Ames, Jr.
3,227,399 A * 1/1966 Dastoli .................. B64C 1/062
244/2

(Continued)

FOREIGN PATENT DOCUMENTS

EP 2 428 445 A2 3/2012
EP 3020634 A1 5/2016
(Continued)

OTHER PUBLICATIONS

Guilherme Luis, Airplane emergency exit drone, https://www.kickstarter.com/projects/703944256/airplane-emergency-exit-drone/description, May 8, 2018, pp. 1-3.
(Continued)

*Primary Examiner* — Sze-Hon Kong
(74) *Attorney, Agent, or Firm* — Browdy and Neimark, PLLC

(57) ABSTRACT

A deployable device mountable on a carrier vehicle and configured to collect situation awareness data. The deployable device includes at least one recorder device configured to collect situation awareness data. The deployable device is capable of being ejected from the carrier vehicle and can be configured to operate as a vehicle and/or be towed by the carrier vehicle. The deployable device can continue collection of situation awareness data after being ejected.

25 Claims, 24 Drawing Sheets

(51) Int. Cl.
*B64D 3/00* (2006.01)
*B64D 5/00* (2006.01)
*B64D 17/80* (2006.01)

(52) U.S. Cl.
CPC ............... *B64D 5/00* (2013.01); *B64D 17/80* (2013.01); *B64C 2201/082* (2013.01); *B64C 2201/12* (2013.01); *B64C 2201/206* (2013.01)

(58) Field of Classification Search
CPC ........ B64C 2201/206; B64C 2201/123; B64C 2201/208; B64C 2201/148; B64C 2201/205; B64C 2201/021; B64C 2201/104; B64C 2201/145; B64C 2201/146; B64C 2201/185; B64D 3/00; B64D 5/00; B64D 17/80; B64D 3/02; B64D 2045/0065; B64D 45/00; B64D 31/02
See application file for complete search history.

(56) References Cited

U.S. PATENT DOCUMENTS

| | | | | |
|---|---|---|---|---|
| 5,975,464 | A * | 11/1999 | Rutan | B64C 39/02 244/118.2 |
| 6,082,675 | A * | 7/2000 | Woodall, Jr | B64D 1/02 244/137.4 |
| 6,116,606 | A * | 9/2000 | Brum | F41J 9/10 244/1 TD |
| 6,244,537 | B1 * | 6/2001 | Rutherford | B64C 27/02 244/49 |
| 7,478,578 | B2 | 1/2009 | Kirkpatrick | |
| 8,358,967 | B1 | 1/2013 | Rebolledo et al. | |
| 8,392,045 | B2 * | 3/2013 | Vian | B64F 5/60 701/28 |
| 8,646,719 | B2 * | 2/2014 | Morris | B64C 19/00 244/1 TD |
| 8,670,879 | B1 | 3/2014 | Angelucci | |
| 8,706,357 | B1 * | 4/2014 | van den Heuvel | B64D 45/00 701/45 |
| 8,740,134 | B2 * | 6/2014 | Suzuki | B64C 39/024 244/2 |
| 8,880,283 | B2 | 11/2014 | Kaufmann et al. | |
| 8,950,698 | B1 * | 2/2015 | Rossi | B64C 29/0033 244/2 |
| 8,973,860 | B2 | 3/2015 | Beard | |
| 9,187,183 | B2 * | 11/2015 | Argillier | G01S 5/0231 |
| 9,440,749 | B1 * | 9/2016 | Ye | B64D 25/20 |
| 9,452,844 | B1 * | 9/2016 | Ye | B64D 3/00 |
| 9,527,596 | B1 * | 12/2016 | Adams | B64C 39/024 |
| 9,665,094 | B1 * | 5/2017 | Russell | B64D 47/08 |
| 9,738,398 | B1 * | 8/2017 | Wang | B64D 45/00 |
| 9,771,160 | B2 * | 9/2017 | Ye | G06F 1/18 |
| 10,183,760 | B2 * | 1/2019 | Cros | B64D 17/00 |
| 10,380,694 | B1 * | 8/2019 | Grant | G08G 1/205 |
| 2003/0152145 | A1 * | 8/2003 | Kawakita | H04N 7/083 375/240.12 |
| 2005/0204910 | A1 | 9/2005 | Padan | |
| 2006/0060691 | A1 * | 3/2006 | Burns | B64D 7/00 244/1 TD |
| 2009/0224099 | A1 | 9/2009 | Steele et al. | |
| 2009/0294573 | A1 * | 12/2009 | Wilson | B64D 5/00 244/2 |
| 2012/0091259 | A1 * | 4/2012 | Morris | B64C 27/02 244/17.13 |
| 2012/0138741 | A1 * | 6/2012 | Fabre | G01S 5/0231 244/1 R |
| 2012/0166037 | A1 * | 6/2012 | Vinue Santolalla | B64D 45/00 701/32.2 |
| 2012/0310487 | A1 * | 12/2012 | Thomas | G01S 19/17 701/49 |
| 2014/0117147 | A1 * | 5/2014 | Hanna | B64C 39/024 244/2 |
| 2014/0277923 | A1 * | 9/2014 | Kaufmann | B64D 25/20 701/33.4 |
| 2015/0266578 | A1 * | 9/2015 | Elkins | B64D 1/12 244/137.1 |
| 2016/0061984 | A1 * | 3/2016 | Partner | G01V 3/165 324/330 |
| 2016/0068273 | A1 * | 3/2016 | Renn | B63C 7/26 340/982 |
| 2016/0214717 | A1 * | 7/2016 | De Silva | G05D 1/104 |
| 2016/0257415 | A1 * | 9/2016 | Ye | B64D 17/00 |
| 2016/0257421 | A1 * | 9/2016 | Ye | G07C 5/0858 |
| 2016/0355261 | A1 * | 12/2016 | Chin | B64C 39/024 |
| 2017/0063944 | A1 | 3/2017 | Nyikos et al. | |
| 2017/0144762 | A1 * | 5/2017 | Retig | B64C 39/024 |
| 2017/0199520 | A1 * | 7/2017 | Glatfelter | G05D 1/0094 |
| 2017/0251096 | A1 * | 8/2017 | Koepke | G08B 5/002 |
| 2017/0341749 | A1 | 11/2017 | Herber et al. | |
| 2020/0031469 | A1 * | 1/2020 | Zilbertstein | B64C 39/024 |

FOREIGN PATENT DOCUMENTS

| | | |
|---|---|---|
| WO | 2015/034557 A1 | 3/2015 |
| WO | 2015/051436 A1 | 4/2015 |
| WO | 2016/075686 A1 | 5/2016 |
| WO | 2016/095886 A1 | 6/2016 |

OTHER PUBLICATIONS

Leonardo DRS Automatic Deployable Flight Recorders, https://vimeo.com/109276008, Jul. 24, 2018, pp. 1-2.

\* cited by examiner

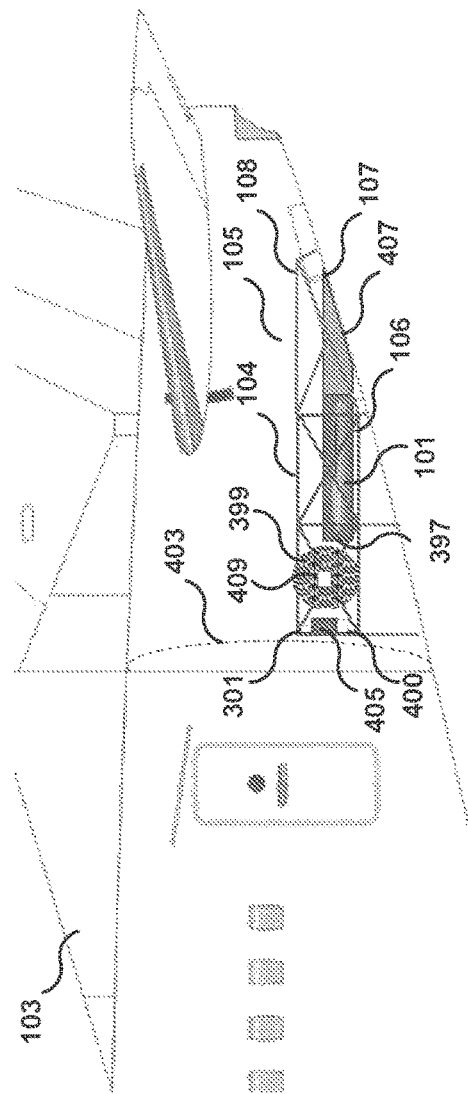

DEPLOYABLE EMERGENCY SITUATION AWARENESS SUPPORT SYSTEM

FIELD OF THE PRESENTLY DISCLOSED SUBJECT MATTER

The presently disclosed subject matter relates to the field of vehicle safety.

BACKGROUND

Vehicles, such as aircraft, may encounter a variety of situations that can be classified as emergencies. Emergency situations can occur due to significant operational problems and/or technical problems in the vehicle. Occasionally during technical difficulties there are unclear circumstances that can develop into more serious events which can put the vehicle in danger.

Unclear circumstances include, for example: lightning strikes potentially causing damage, loss of orientation, partial loss of air data instrument readings, different abnormal flight behavior, unattributed sounds, vibrations, or the like.

More serious events include, for example: electrical power loss, reduction of flight control, engine performance difficulties, loss of cabin pressure, hydraulic system problems, smoke in the cabin, landing gear locking/deployment problems, tire pressure, bird strike, aircraft structural issues, unavoidable severe weather threatening aircraft safety, terrorism, sabotage, suicidal crew, destructive passengers, and all other foreseen and unforeseen types of emergencies threatening the safety of flight.

Some situations may result in the crashing of the vehicle or the vehicle going missing.

In all of these situations, additional information is needed to better assess, control and/or manage the situation. Additional information can help, for example, to prevent unclear circumstances from becoming more serious events.

SUMMARY

According to one aspect of the presently disclosed subject matter there is provided a deployable device being mountable on a carrier vehicle and configured to collect situation awareness data. The deployable device includes at least one recorder device configured to collect situation awareness data. The deployable device is capable of being ejected from the carrier vehicle, responsive to an ejection request. The deployable device is configured as a vehicle. The deployable device includes a control unit configured to control the vehicle after being ejected. The deployable device is further configured to continue collection of situation awareness data after being ejected.

In addition to the above features, the deployable device according to this aspect of the presently disclosed subject matter can include one or more of features (i) to (xxi) listed below, in any desired combination or permutation which is technically possible:

(i). The deployable device is connected to a towing mechanism connected to the carrier vehicle, wherein, upon ejection of the deployable device from the carrier vehicle, the deployable device is towed by the towing mechanism of the carrier vehicle. The deployable device is further configured to continue collection of situation awareness data after ejection, while being towed. Furthermore, the deployable device is capable of being released from the towing mechanism, responsive to a release request.

(ii). The deployable device is configured as an aerial vehicle including wings, wherein the wings are in retracted position while the deployable device is onboard the carrier vehicle. The deployable device is configured to extend the wings after ejection from the carrier vehicle, wherein, the control unit is configured to control the flight of the deployable device.

(iii). The deployable device further includes an engine for propelling the deployable device.

(iv). The deployable device wherein the control unit is configured to direct the flight of the deployable device along a flight path. Wherein, the flight path of the deployable device includes one or more of: a flight path intended for tracking the flight path of the carrier vehicle; a flight path around a crash site of the carrier vehicle; a flight path towards a predefined location; and a flight path towards a location determined in real-time.

(v). The deployable device includes an emergency control unit operatively connected to an ejection mechanism. The emergency control unit is configured to generate an instruction for activating the ejection mechanism configured to eject the deployable device from the carrier vehicle, responsive to the ejection request.

(vi). The deployable device wherein the emergency control unit remains mounted to the carrier vehicle after ejection of the deployable device from the carrier vehicle.

(vii). The deployable device further includes a release module operatively connected to a release mechanism. The release module is configured to generate an instruction to the release mechanism to release the deployable device from being towed by the carrier vehicle, responsive to the release request.

(viii). The deployable device further includes a landing control unit operatively connected to a landing mechanism. The landing control unit is configured to generate an instruction to activate the landing mechanism for landing the deployable device, responsive to a landing request.

(ix). The deployable device wherein the landing mechanism includes one or more of: a parachute; a floatation device; landing skids; landing gear; and a landing system.

(x). The deployable device is further configured to continue collection of situation awareness data after landing.

(xi). The deployable device includes at least one data acquisition device for acquiring situation awareness data.

(xii). The deployable device wherein the data acquisition device includes one or more of: a payload; an air-data sensor; and an altitude measurement instrument.

(xiii). The deployable device further includes a data transmission module configured to transmit the situation awareness data after ejection.

(xiv). The deployable device includes at least one camera for capturing images in the vicinity of the deployable device.

(xv). The deployable device is configured as an aerial vehicle including tail surfaces, wherein the tail surfaces are in retracted position while the deployable device is onboard the carrier vehicle. The deployable device is configured to extend the tail surfaces after ejection from the carrier vehicle.

(xvi). The deployable device is further configured to travel in the vicinity of a crash site of the carrier vehicle and collect situation awareness data from the crash site.

(xvii). The deployable device is further configured to operate responsive to received instructions sent from an operator.

(xviii). The deployable device further includes computer storage configured to store the collected situation awareness data.

(xix). The deployable device wherein the ejection request is an internal request generated in response to detection of one or more emergency conditions, or an external request generated by an external source.

(xx). The deployable device wherein the release request is an internal request generated in response to detection of one or more release conditions, or an external request generated by an external source.

(xxi). The deployable device wherein the landing request is an internal request generated in response to detection of one or more landing conditions, or an external request generated by an external source.

According to another aspect of the presently disclosed subject matter there is provided a method including: mounting a deployable device onboard a carrier vehicle, the deployable device is configured to collect situation awareness data; operating at least one recorder device onboard the deployable device for collecting situation awareness data; releasing the deployable device from the carrier vehicle, responsive to a release request; operating the deployable device as a vehicle upon release; and continuing collection of situation awareness data by the deployable device after being released.

The method according to this aspect of the disclosed subject matter can optionally include: ejecting the deployable device from the carrier vehicle, responsive to an ejection request; towing the deployable device by the carrier vehicle upon ejection; and continuing collection of situation awareness data by the deployable device after ejection, while being towed.

This aspect of the disclosed subject matter can optionally include one or more of features (ii) to (xxi) listed above, mutatis mutandis, in any desired combination or permutation which is technically possible.

According to another aspect of the presently disclosed subject matter there is provided a system for collecting situation awareness data of a carrier vehicle. The system includes: a deployable device configured to collect situation awareness data; an ejection sub-system including an ejection module and an ejection mechanism configured to eject the deployable device from the carrier vehicle, responsive to an ejection request, and wherein the deployable device is configured as a vehicle. The deployable device is further configured to continue collection of situation awareness data after being ejected.

This aspect of the disclosed subject matter can optionally include one or more of features (i) to (xxi) listed above, mutatis mutandis, in any desired combination or permutation which is technically possible.

According to another aspect of the presently disclosed subject matter there is provided an aircraft including: a deployable device configured to collect situation awareness data of the aircraft; an ejection sub-system including an ejection module and an ejection mechanism configured to eject the deployable device from the aircraft, responsive to an ejection request, and wherein the deployable device is configured as a vehicle. The deployable device is further configured to continue collection of situation awareness data after being ejected.

This aspect of the disclosed subject matter can optionally include one or more of features (i) to (xxi) listed above, mutatis mutandis, in any desired combination or permutation which is technically possible.

According to another aspect of the presently disclosed subject matter there is provided a deployable device being mountable on a carrier vehicle and configured to collect situation awareness data. The deployable device includes at least one recorder device configured to collect situation awareness data. The deployable device is capable of being ejected from the carrier vehicle, responsive to an ejection request. The deployable device is connected to a towing mechanism connected to the carrier vehicle, wherein, upon ejection of the deployable device from the carrier vehicle, the deployable device is towed by the towing mechanism of the carrier vehicle. The deployable device is further configured to continue collection of situation awareness data after ejection, while being towed.

The deployable device according to this aspect of the disclosed subject matter can optionally be configured as a vehicle capable of being released from the towing mechanism, responsive to a release request. The deployable device includes a control unit configured to control the vehicle while operating after release. The deployable device is further configured to continue collection of situation awareness data after being released.

The deployable device according to this aspect of the disclosed subject matter can optionally include one or more of features (ii) to (xxi) listed above, mutatis mutandis, in any desired combination or permutation which is technically possible.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 7 is a schematic illustration in cross section view of the aft fuselage section of the commercial aircraft of FIG. 3, in accordance with an example of the presently disclosed subject matter;

DETAILED DESCRIPTION

Figure 1:
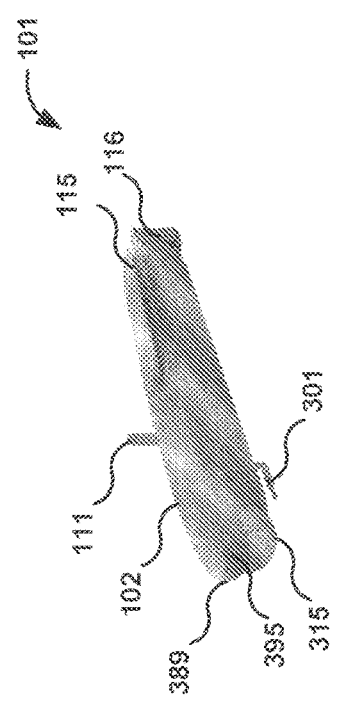
FIG. 1 is a schematic illustration of a Deployable Emergency Situation Awareness Support System (DESASS) in standby phase with wings retracted, in accordance with an example of the presently disclosed subject matter.

In the drawings and descriptions set forth, identical reference numerals may be used to indicate those components that are common to different examples or configurations. Elements in the drawings are not necessarily drawn to scale.

Unless specifically stated otherwise, as apparent from the following discussions, it is appreciated that throughout the specification discussions utilizing terms such as "collecting", "storing", "generating", "determining", "calculating", or the like, include action and/or processes of a computer that manipulate and/or transform data into other data, said data represented as physical quantities, e.g. such as electronic quantities, and/or said data representing the physical objects.

The terms "computer", "computerized device", "processing unit" or variations thereof should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

As used herein, the phrase "for example," "such as", "for instance" and variants thereof describe non-limiting examples of the presently disclosed subject matter. Reference in the specification to "one case", "some cases", "other cases" or variants thereof means that a particular feature, structure or characteristic described in connection with the example(s) is included in at least one example of the presently disclosed subject matter. Thus the appearance of the phrase "one case", "some cases", "other cases" or variants thereof does not necessarily refer to the same example(s).

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Figure 6A:
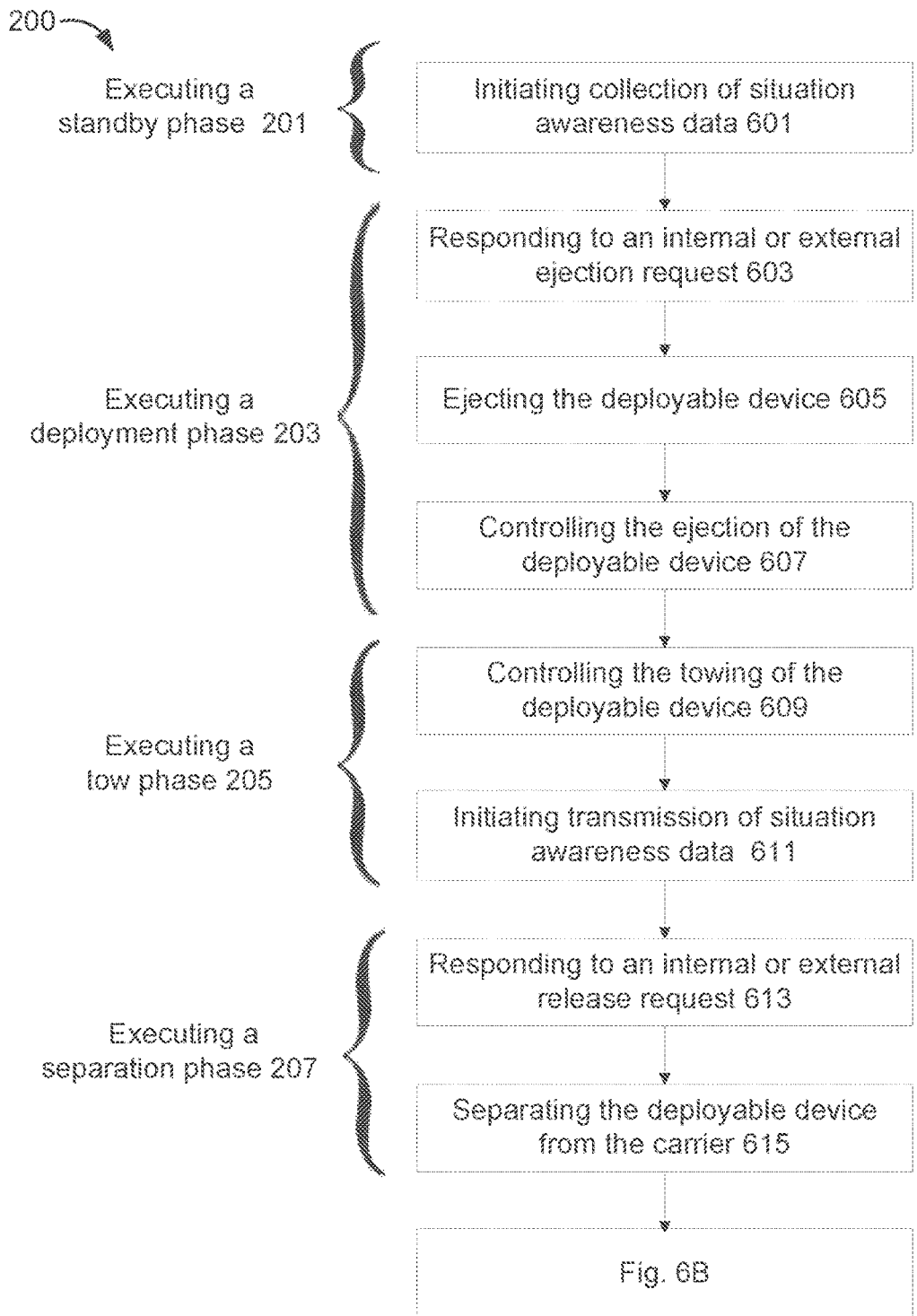
FIGS. 6A-6B are flowcharts showing a sequence of phases and their associated operations which are carried out by the DESASS, in accordance with an example of the presently disclosed subject matter.
Figure 6B:
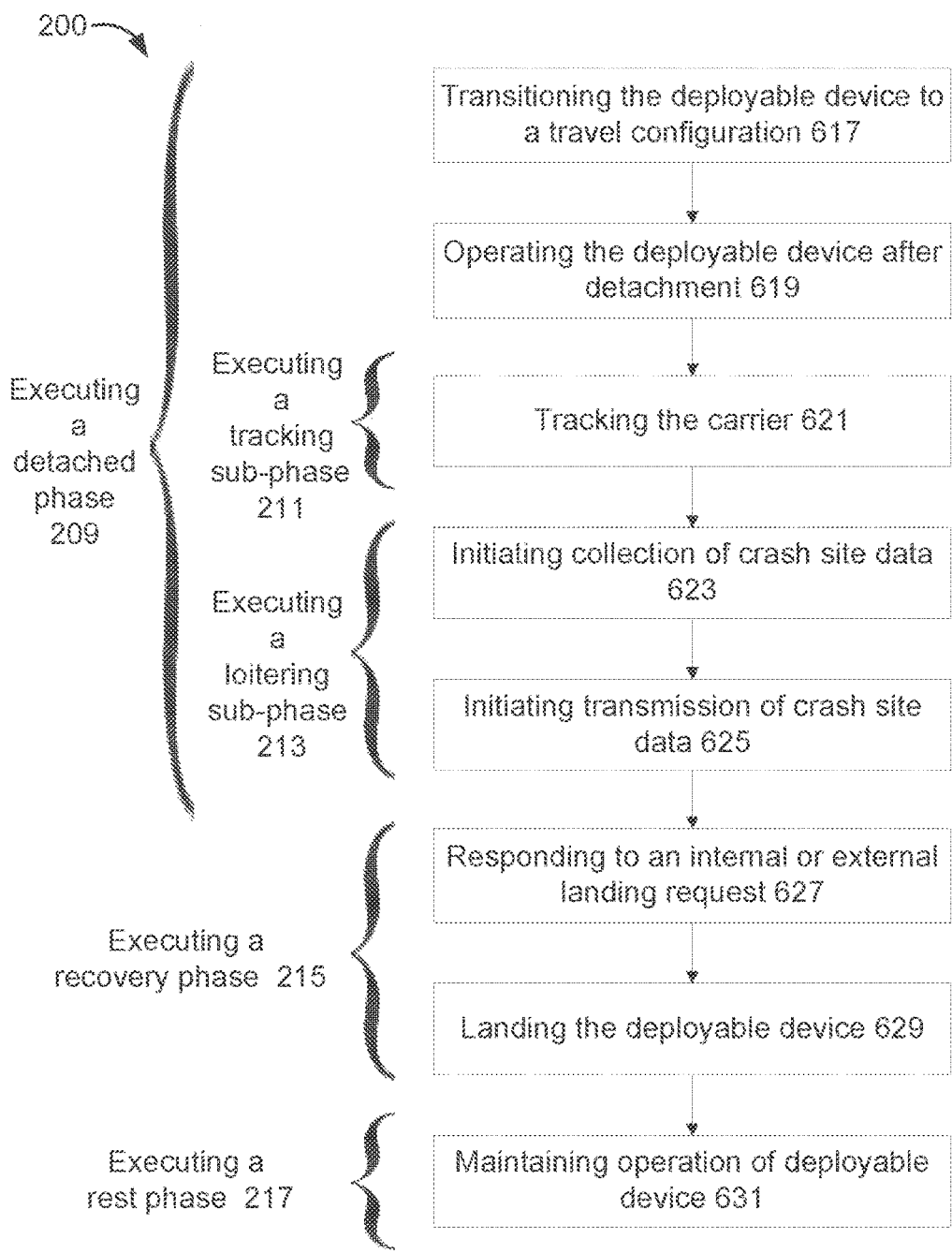

In examples of the presently disclosed subject matter, fewer, more and/or different stages than those shown in FIGS. 6A-6B can be executed. In examples of the presently disclosed subject matter one or more stages illustrated in FIGS. 6A-6B can be executed in a different order and/or one or more groups of stages can be executed simultaneously. For example, the step of initiating transmission can be performed before the step of ejecting the deployable device.

Figure 21:
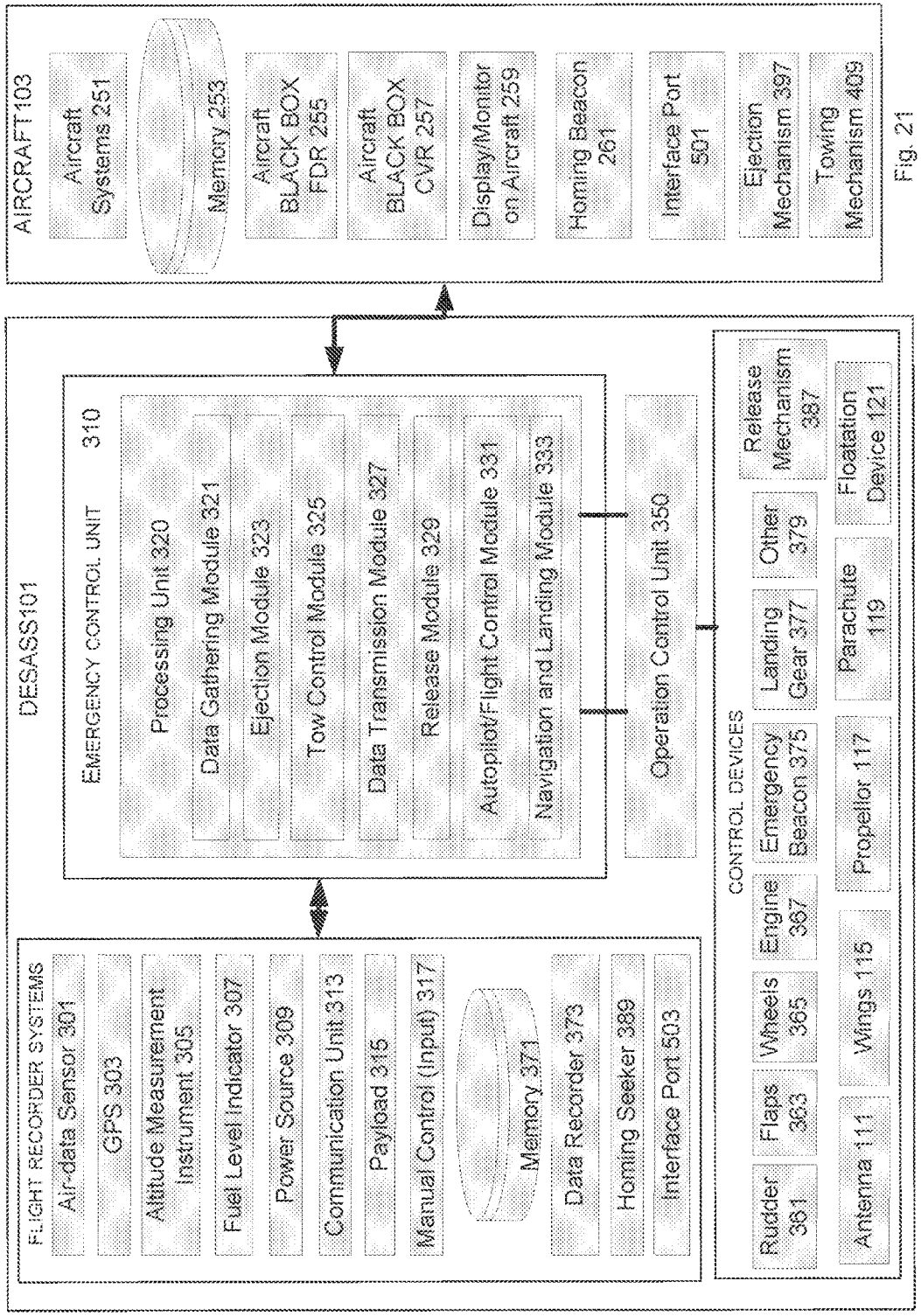
FIG. 21 is a functional block diagram schematically illustrating an onboard control unit of the DESASS, in accordance with an example of the presently disclosed subject matter.

FIG. 21 illustrates a general schematic of the system architecture in accordance with an example of the presently disclosed subject matter. Functional elements in FIG. 21 may be centralized in one location or dispersed over more than one location. In other examples of the presently disclosed subject matter, the system may comprise fewer, more, and/or different functional elements than those shown in FIG. 21. For example, one or more elements can be located on the aircraft itself and not the DESASS. These elements may be separated from the DESASS upon the ejection or release of the DESASS from the aircraft. For example, the decision to eject and/or release the DESASS can be made by systems onboard the aircraft.

While the following description and accompanying figures refer to an aircraft, this is done by way of example only, and the elements and principles described with reference to FIGS. 1-23 are similarly applicable in other vehicles.

The term "DESASS" refers to a Deployable Emergency Situation Awareness Support System device or "deployable device" which is described herein. DESASS can be used in any appropriate carrier vehicle (e.g. aircraft, marine vehicle, submarine, etc.), and is not limited to a flight recorder dedicated for aircrafts. According to one example, DESASS can be configured as a detachable unmanned aerial vehicle (UAV) stored onboard the carrier vehicle that is capable of being readily ejected from the carrier vehicle. In some examples, DESASS can be configured as another type of appropriate unmanned vehicle (U.V), including, for example, an unmanned marine vehicle stored onboard a marine vessel (e.g. ship), or an unmanned submarine vehicle stored onboard a submarine.

In the following description the term "situation awareness data" should be broadly construed to include any information pertaining to conditions of the aircraft or DESASS and environmental conditions around the aircraft or the DESASS. Situation awareness data can include visual and/or audio data. Situation awareness data can include carrier related data and carrier operational data. Situation awareness data can include for example any one or more of the following: position of the aircraft or DESASS (including 3D (x,y,z) location in space and orientation (pitch, yaw, turn)), direction, groundspeed, airspeed, altitude, aircraft's weight, DESASS's weight, glide ratio, glide distance, glide speed, aircraft's drag coefficient, DESASS's drag coefficient, aircraft's lift coefficient, DESASS's lift coefficient, aircraft's operational condition or DESASS's operational condition (e.g. whether the aircraft's engine or the DESASS's engine is operative or not, whether uplink communication is operative or not), etc.

The terms "emergency situation" and "emergency scenario" can include for example an emergency due to a mechanical failure, an attempted hijacking, any unexpected or long term communication loss between the aircraft and air traffic control, or any intentional or unintentional crash, impact or explosion of the aircraft.

Figure 2:
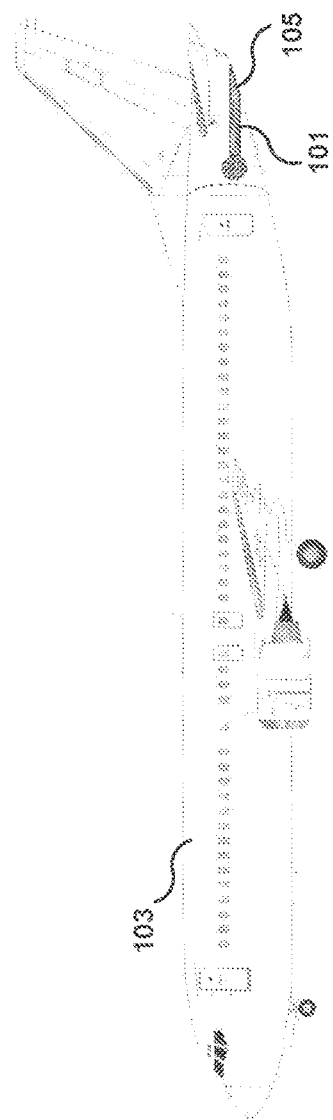
FIG. 2 is a schematic illustration of a commercial aircraft configured to carry the DESASS inside the aft fuselage section, in accordance with an example of the presently disclosed subject matter.

Bearing the above in mind, attention is now drawn to FIGS. 1 and 2. FIG. 1 is a schematic illustration of an example of a DESASS 101 in a standby phase. FIG. 2 is a schematic illustration of a commercial aircraft 103 configured to carry DESASS 101 for the purpose of monitoring and recording the aircraft's operation.

DESASS 101 is configured to collect situation awareness data pertaining to aircraft 103 similar to situation awareness data gathered by conventional flight recorders. For example, the operation of such conventional flight recorders is described in International Civil Aviation Organization (ICAO) Annex 6.

Figure 3:
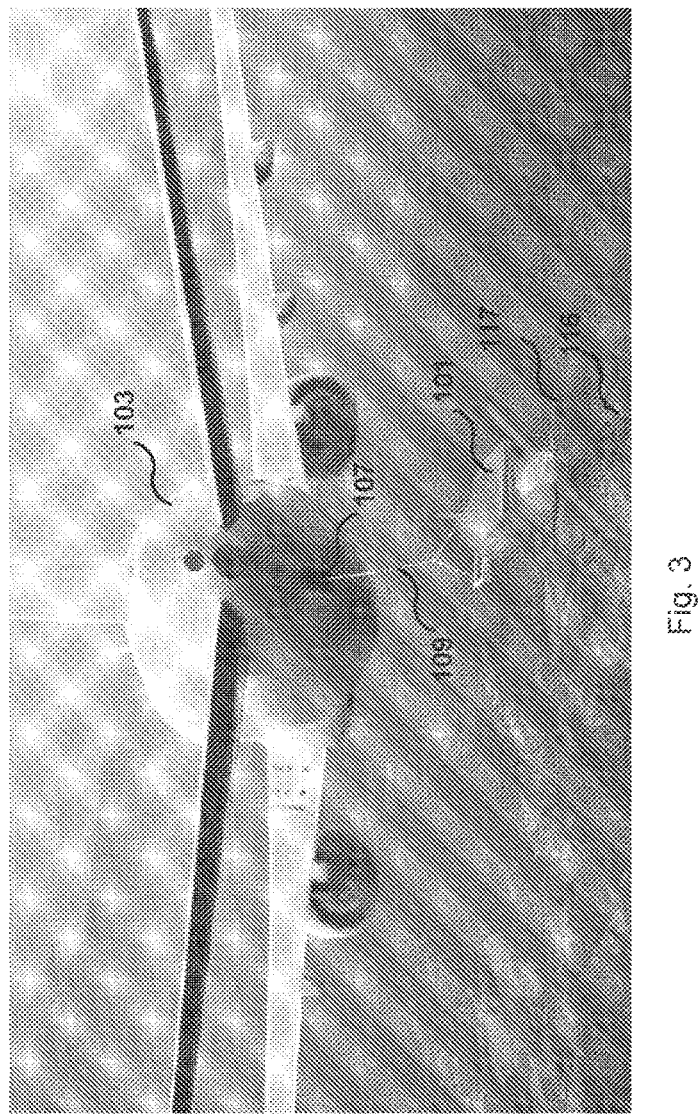
FIG. 3 is a schematic illustration of the DESASS in tow phase, in accordance with an example of the presently disclosed subject matter.
Figure 4:
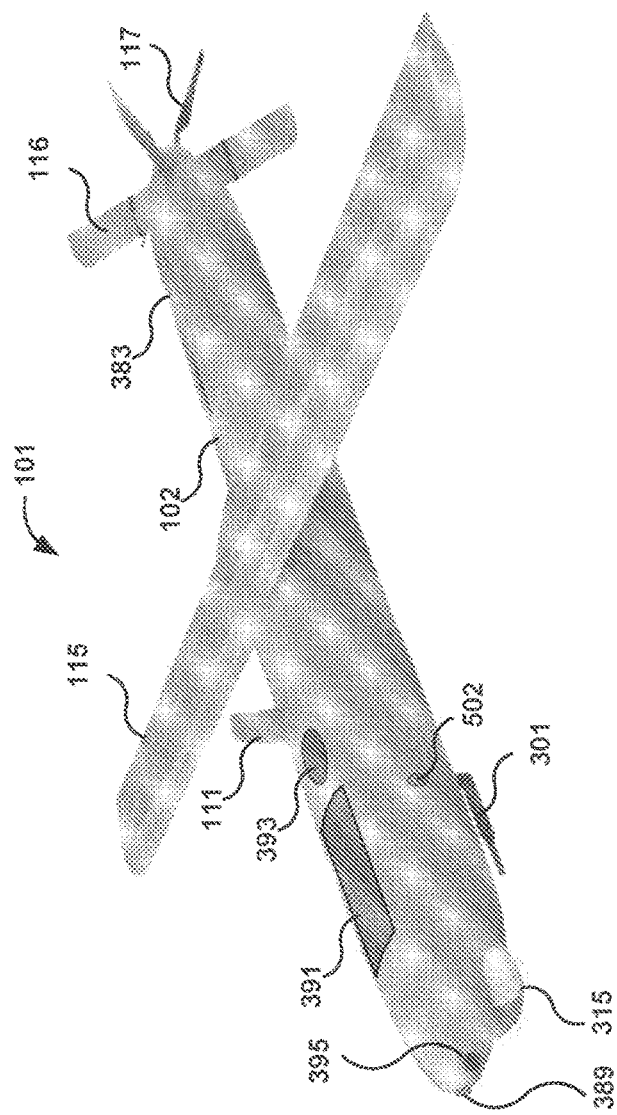
FIG. 4 is a schematic illustration of the DESASS in detached phase with wings extended, in accordance with an example of the presently disclosed subject matter.

While DESASS 101 operates onboard aircraft 103, DESASS 101 can operate in a manner similar to the operation of the black box of aircraft 103 and can optionally replace the black box of aircraft 103. However according to the presently disclosed subject matter, DESASS 101 is also configured to operate while being towed by aircraft 103 and as an unmanned aerial vehicle capable of fully autonomous and/or partially autonomous flight, as illustrated below with reference to FIGS. 3 and 4 respectively. FIG. 3 is a schematic illustration of DESASS 101 in tow phase. FIG. 4 is a schematic illustration of DESASS 101 in detached phase. In both phases DESASS 101 can continue to collect situation awareness data.

DESASS 101 can also transmit collected situation awareness data. The transmitted situation awareness data can provide important information, as will be described in detail below.

As an example, DESASS 101 can be configured as a detachable UAV stored onboard aircraft 103.

In some examples, DESASS 101 is designed as a UAV with wings 115, tail surfaces 116 and an engine configured to operate at least one propeller 117 or any other type of engine (e.g. jet turbine). One or more of the wings 115, tail surfaces 116 and propeller 117 (if used) of DESASS 101 can be retractable and extendable.

As illustrated in FIG. 1, when DESASS 101 is in standby phase and not in flight, wings 115, tail surfaces 116, and propeller 117 can be stored in retracted positions to conserve space onboard aircraft 103. When wings 115, tail surfaces 116, and propeller 117 are in retracted positions, wings 115, tail surfaces 116 and propeller 117 can be folded or collapsed inside or around the body 102 of DESASS 101.

Under certain circumstances, described in detail below, DESASS 101 can be ejected from aircraft 103. For example, DESASS 101 can be stored in a designated compartment 105 inside a canister in proximity to an ejection hatch 107 of aircraft 103. Ejection hatch 107 can be configured to open during ejection of DESASS 101, as illustrated in FIG. 3, In some examples, compartment 105 can be located in the aft fuselage section behind the rear pressure bulkhead of aircraft 103.

Under certain circumstances, following ejection, DESASS 101 can be operated in a tow phase where DESASS 101 is towed by aircraft 103 using tow cable 109.

Wings 115, tail surfaces 116, and propeller 117 can be aerodynamically configured to facilitate the towing of DESASS 101 in tow phase.

In some examples, in tow phase wings 115 remain in a retracted position and tail surfaces 116 and/or propeller 117 are in extended positions. In some examples, while DESASS 101 is in tow phase the rotation of propeller 117 by wind forces can cause the electrical charging of a power source of DESASS 101. In such cases, DESASS 101 further includes an electric generator operatively connected to propeller 117 and to a battery configured for generating and storing energy in the battery.

Under certain circumstances DESASS 101 can operate in a detached phase, where DESASS 101 is completely detached from aircraft 103 and operates as a detached unit. As illustrated in FIG. 4, in some examples in detached phase, when DESASS 101 is flying, wings 115, tail surfaces 116, and propeller 117 are in extended positions.

In some examples, in detached phase DESASS 101 operates as a fully or partially autonomous vehicle.

According to one example, in detached phase DESASS 101 can be propelled by propeller 117 or by some other propelling system. Propeller 117 can be rotated by an engine powered by a power source onboard DESASS 101. As an example, DESASS 101 can be a VTOL (vertical take-off and landing) aircraft. Alternatively, DESASS 101 can be a glider without an engine or propeller 117.

DESASS 101 can be configured to operate in additional phases, for example, a deployment phase and a separation phase. In some cases, responsive to an ejection request, DESASS 101 is ejected from aircraft 103 in a deployment phase and then continues to operate in tow phase until a release request is generated or received. Responsive to the release request, DESASS 101 is released from aircraft 103 in a separation phase and then proceeds to operate in detached phase where DESASS 101 can perform free flight as an independent vehicle. Alternatively, DESASS 101 can be released immediately from aircraft 103 without being towed. These phases are described in detail below.

An ejection request can be an internal request generated in response to detection of one or more emergency conditions, e.g., related to the carrier vehicle, or an external request generated by an external source, e.g., the crew, the aircraft's company, Air Traffic Control (ATC), another vehicle, etc. A release request can be an internal request generated in response to detection of one or more release conditions, e.g., related to the carrier vehicle, or an external request generated by an external source, e.g. the crew, the aircraft's company, ATC, another vehicle, etc. Examples of emergency conditions and release conditions are provided below.

DESASS 101 can also be configured to operate in other additional phases. For example, a tracking phase, a loitering phase, a recovery phase and a rest phase. These phases are also described in detail below.

DESASS 101 can include at least one recorder device configured to collect situation awareness data. The recorder device can be any suitable device configured to record data. The recorder device can be configured to be impact-resistant, fire-proof, and water-proof. The recorder device can also include a locating beacon attached to the recorder device. For example, the recorder device can be an internal FDR and CVR separate from the black box of aircraft 103.

The situation awareness data that DESASS 101 collects and records can be determined by DESASS 101 independently of aircraft 103. Alternatively, the situation awareness data that DESASS 101 collects and records can be determined by one or more systems of aircraft 103 or by a combination of autonomous systems and systems of aircraft 103. For example, DESASS 101 can collect situation awareness data determined by the conventional black box of aircraft 103. The black box of aircraft 103 can include a flight data recorder (FDR) and cockpit voice recorder (CVR).

Figure 5:
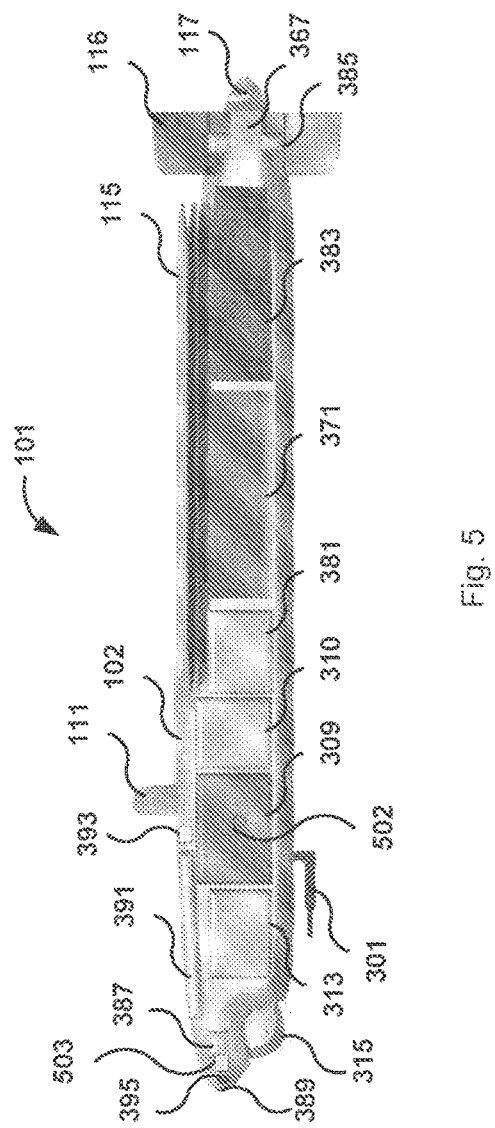
FIG. 5 is a schematic illustration of the DESASS of FIG. 1 in cross section view, in accordance with an example of the presently disclosed subject matter.

Attention is now drawn to FIG. 5. FIG. 5 is a schematic illustration of DESASS 101 in cross section view.

DESASS 101 includes a body 102 providing mechanical support and housing various devices and components including for example: data-repository or memory 371, communication unit 313, power source 309, static port 502, interface port 503, emergency control unit 310, wing extension and retraction mechanism 381, recovery parachute housing 383, motor 367, tail servo actuators 385, tail surfaces 116, cable release mechanism 387, homing device 389, attachment points 395 for a towing cable, payload 315, air-data sensor 301, antenna 111, SATCOM antenna 391, Global Positioning System (GPS) antenna 393, wings 115, and propeller 117.

According to some non-limiting examples, functional units onboard DESASS 101 can include the following characteristics: Data-repository 371 can include a crash survivable memory unit (CSMU) or any other appropriate data storage device or system configured for storing data. Power source 309 can be a re-chargeable battery. Static port 502 can be usable for obtaining static pressure. Interface port 503 can be operatively connectable to a corresponding interface port on a carrier vehicle. Emergency control unit 310 can include an avionics unit. Wing extension and retraction mechanism 381 can be used to retract and extend wings 115. Recovery parachute housing 383 can house a stored parachute 119. Motor 367 can be an electrical engine or motor. Motor 367 can also function as a wind-powered generator (windmill generator). Tail servo actuators 385 can be used to retract and extend foldable tail surfaces 116. Tail surfaces 116 can be stabilizing tail fins and flight control surfaces. Attachment points 395 can be attached to a wired tow cable 119. Cable release mechanism 387 can be any suitable release mechanism configured to detach tow cable 119, such as a weak link or cable guillotine. Payload 315 can include one or more of: a forward, rear, and/or side looking, gimbaled or non-gimbaled, day and/or infrared (IR) camera. Air-data sensor 301 can be an airspeed sensor, such as a pitot tube. Antenna 111 can be a traffic alert and collision avoidance system (TCAS) antenna. Propeller 117 can be a foldable rear-facing or front-facing propeller.

DESASS 101 can be removably mounted onboard a carrier vehicle. Body 102 can have, for example, a tubular fuselage that is easily stored in a canister inside a compartment of the carrier vehicle. In some examples, body 102 of DESASS 101 has a rigid structure built to withstand being towed at high speeds.

Body 102 can be designed to enable DESASS 101 to operate as a vehicle depending on the specific designated medium. For example, body 102 can be designed with an aerodynamic shape to operate in air. As another example, body 102 can be designed with a hydrodynamic shape to operate in water.

In some examples wings 115 can be in a substantially parallel alignment with body 102 of DESASS 101 when in a retracted position. In some examples wings 115 can be in a substantially perpendicular alignment with body 102 of DESASS 101 when in an extended position. In these examples wings 115 can be changed from a retracted position to an extended position, and vice versa, by using wing extension and retraction mechanism 381 to rotate wings 115 on an axis that is perpendicular to the body 102 of DESASS 101.

Operation of DESASS 101 is further explained below with reference to Flowchart 200 in FIGS. 6A-6B. The operations described with reference to FIGS. 6A-6B can be executed, for example, by an emergency control unit installed onboard DESASS 101. A functional block diagram showing an example of an emergency control unit 310 is described in detail with reference to FIG. 21 below.

FIGS. 6A-6B are described in conjunction with FIGS. 1-5 and 7-20. FIGS. 7-20 show schematic illustrations of DESASS 101 in various phases of operation, in accordance with examples of the presently disclosed subject matter.

Operation can include executing 201 a standby phase. Executing a standby phase can include initiating (601) collection of situation awareness data. Collection can include obtaining, recording, and storage of situation awareness data.

Situation awareness data can be obtained, for example, directly from one or more of the onboard systems of a carrier aircraft. One example of an interface between DESASS 101 and aircraft 103 is described further below with reference to FIG. 22.

Situation awareness data can also be obtained independently of the carrier aircraft, e.g. using one or more sensors or other devices operating as part of DESASS 101 and configured for obtaining and recording data. The obtained situation awareness data can be recorded and stored on computer memory (including non-transitory computer memory).

This data gathering procedure can be initiated and performed during a normal flight mode of aircraft 103 (i.e. during normal operation, not an emergency situation) and can be executed for example by a data gathering module of emergency control unit 310. The recorded situation awareness data can be constantly updated based on real-time aircraft situation data. For example, the situation awareness data can be updated at predetermined intervals of time.

Attention is now drawn to FIG. 7, a schematic illustration showing a cross section view of the aft of aircraft 103.

As illustrated in FIG. 7, at least one DESASS 101 executing standby phase can be stored inside a designated compartment 105 in aircraft 103. For example, DESASS 101 can be stored in a sealed capsule or canister 106 in compartment 105 inside aircraft 103. Designated compartment 105 can be located for example in an unpressurized area towards the aft of aircraft 103 e.g. behind the rear compression bulkhead 403.

In other examples, DESSASS 101 can be stored in an aerodynamically shaped carrying pod or capsule that is external to the fuselage of aircraft 103.

Compartment 105 can also house supporting equipment such as an additional battery 405 for powering DESASS 101, Battery 405 can be external to DESASS 101. For example, battery 405 can provide power to DESASS 101 as long as it is operatively connected to aircraft 103 via wired tow cable 109, illustrated below with reference to FIG. 8.

Compartment 105 can also house a tow cable drum 399 operatively connected to a cable drum deployment control unit 400. Cable drum deployment control unit 400 is configured to control the operation of cable drum 399. A length of tow cable 109 can be removably coiled around cable drum 399.

In some examples, compartment 105 can also house an emergency control unit 310 that is external to DESASS 101 and can make at least some of the decisions described herein. An example of an emergency control unit 310 is described in greater detail with reference to FIG. 21 below.

Canister 106 can include an ejection mechanism 397. Ejection mechanism 397 can be any appropriate mechanism for ejecting DESASS 101 from aircraft 103. Ejection mechanism 397 can be activated mechanically and/or electronically. As an example, ejection mechanism 397 can be a spring loaded ejection mechanism including a fully compressed deployment spring.

Canister 106 can be configured to be stored in a wide range of carrier vehicles. In some examples, canister 106 can include a general structural support unit 104. The general structural support unit 104 can be a structural cradle or installation mount designed to support canister 106 and cable drum 309 installation in a plurality of different types of carrier vehicles.

Canister 106 can also include a specially tailored structural fitting support unit 108. Tailored structural fitting support unit 108 can be designed to allow the integration of the general structural support unit 104 on a specific type of carrier vehicle or type of specific vehicle within that type of vehicle, e.g., for aircraft in general or a specific type of aircraft.

Canister 106 can also include a specially tailored canister mouth 407. As an example, canister mouth 407 can be aligned with ejection hatch 107 to facilitate ejection of DESASS 101.

Referring back to FIG. 6A, operation can further include executing 203 a deployment phase. Executing a deployment phase can include responding (603) to an ejection request, ejecting (605) the deployable device, and controlling (607) the ejection of the deployable device. Controlling the ejection of the deployable device can include controlling the uncoiling of a length of tow cable.

Responding (603) to an ejection request can follow the preliminary detecting of an emergency condition and generating of an ejection request, or the receiving of an ejection request from an external source.

Responsive to an ejection request, either an internal request generated after detection of one or more emergency conditions (e.g. by emergency control unit 310) or an external request generated by an authorized external source (e.g., the crew, ATC, or the company), DESASS 101 is ejected either manually or automatically from the carrier aircraft. In some cases, an external request can require additional verification and/or validation. In some cases a combination of conditions can be required to activate ejection of DESASS 101.

For example, an ejection module 323 of emergency control unit 310 can be connected to various sensors and configured to identify when conditions for activating ejection are met and generate an ejection request including instructions to activate ejection by an ejection mechanism 397. Emergency control unit 310 can be configured to detect certain conditions indicative of an emergency related to aircraft 103. When these predefined emergency conditions are detected DESASS 101 can be configured to be ejected automatically by the ejection module of emergency control unit 310.

Such conditions include, for example: failure of aircraft 103 to comply with the flight plan (a flight path separation from the planned route as a result of aircraft 103 going significantly off course while taking into account reasonable course alteration such as weather related diversions or diverting to an alternate landing field as coordinated together with ATC), airspeed bleed, an abrupt maneuver, a critical in-flight system malfunction (e.g. due to engine fire, auxiliary power unit (APU) fire, in-flight engine shut down, or sudden decompression), the pitch going up or down a certain amount (e.g. up 25-30 degrees, or down 13-17 degrees) in a short period of time, the rate of descent exceeding a certain amount per minute (e.g. 6,000-8,000 feet per minute), emergency squawk codes, stick shaker or stall warning activation under certain specific conditions (for example in a clean configuration with the gear up and the flaps/slats/LEF up if activated more than once within a certain timeframe, or in a configuration with flaps/slats/LEF extended if activated more than once within a certain timeframe, stick shaker activation duration if above a certain threshold, activation of an Enhanced Ground Proximity Warning System (EGPWS), or activation of Terrain Awareness and Warning System (TAWS).

Alternatively, the ejection of DESASS 101 can be performed manually by a member of the crew upon the detection of conditions indicative of an emergency.

Manual ejection of DESASS 101 can be based on a decision made by the pilot or another cockpit crew member. This decision can be made in various situations including for example: the pilot experiencing disorientation, or vertigo, due to a major systems malfunction of aircraft 103, the pilot witnessing the performance of unlawful acts aboard aircraft 103 (e.g. an intrusion into the cabin, a struggle aboard aircraft 103, or an attempt to hijack the aircraft), the pilot noticing danger such as fire or smoke onboard, or an abnormal landing gear configuration.

In some cases crew members other than the pilot or cockpit crew can also control ejection of DESASS 101. The decision to eject DESASS 101 can be made in various situations including for example: a crew member witnessing unlawful acts, suspicious loss of contact with the cockpit crew or pilot(s), visual or audio cues concerning aircraft integrity (e.g. a sudden engine rotor burst or severe knocking noises), and cabin fire or smoke. DESASS 101 can include an interface that can be operated by the crew members for generating an ejection request. Such a request can require additional verification and/or validation.

As mentioned above, in other cases DESASS 101 can receive an ejection request generated by an authorized external source (e.g. ATC or the company running a specific air vehicle).

For example, if aircraft 103 becomes unresponsive or takes an unauthorized diversion from its planned route or altitude the company running aircraft 103 can generate and transmit an ejection request signal towards the aircraft 103 carrying DESASS 101 for deploying its onboard DESASS 101.

An ejection request can include parameters such as instructions of tasks for DESASS 101 to perform, the source of the request, and validation/authorization credentials. For example, an ejection request can be generated and transmitted to request ejection of DESASS 101 under specific circumstances. For example, an ejection request can be transmitted to DESSAS 101 in order to use DESASS 101 in order to assist in an emergency unrelated to aircraft 103. For example, to survey a nearby crash site or an airplane ditching site related to another vehicle or aircraft, which, for example, was not equipped with a DESASS, and crashed or crash landed in the vicinity of aircraft 103 carrying DESASS 101. In such case DESASS 101 can, for example, immediately detach itself from towing cable 109 after being safely ejected from aircraft 103 in order to divert to the desired location as directed by the ejection request received from the authorized external source (e.g., another vehicle, ATC or company).

In either case, either automatic or manual ejection, any type of suitable ejection mechanism 397, as described above, can be used for ejecting (605) the deployable device. DESASS 101 can be ejected from aircraft 103 via an ejection hatch 107, illustrated in FIG. 7.

When executing deployment phase DESASS 101 is designed to perform a relatively quick and safe ejection from aircraft 103 and a safe and controlled uncoiling of tow cable 109. In some cases when executing deployment phase DESSAS 101 can be located below aircraft 103 at an altitude lower than aircraft 103.

While executing deployment phase, the distance of DESASS 101 from aircraft 103 can be adapted based on a desired operation of DESASS 101. The uncoiling of tow cable 109 of DESASS 101 can be controlled by a tow control module 325 of emergency control unit 310. For example, the tow control module can be configured to operate a towing mechanism 409 utilized for towing DESASS 101 by aircraft 103. Towing mechanism 409 can be operatively connected to cable drum deployment control unit 400. For example, the tow control module can control the towing mechanism 409 to adjust the length of uncoiled tow cable 109 to optimize the distance of DESASS 101 from aircraft 103 while DESASS 101 is in tow phase. For example, the towing mechanism 409 can be a winch connected to tow cable drum 399 of tow cable 109.

Figure 8:
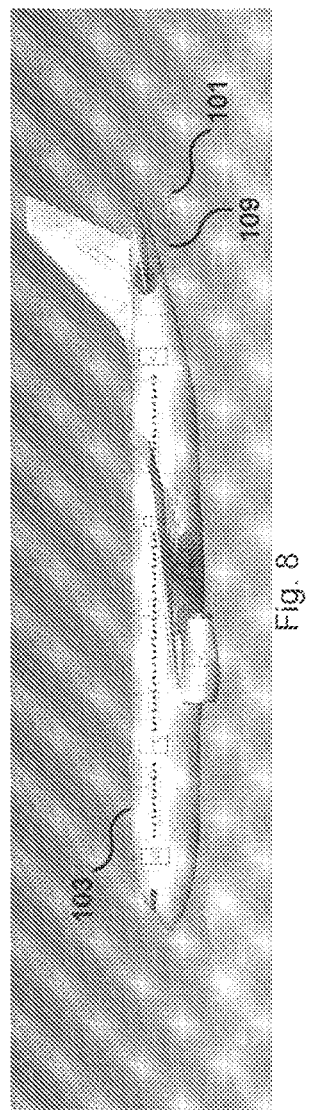
FIG. 8 is a schematic illustration of the DESASS in deployment phase in accordance with an example of the presently disclosed subject matter.

FIG. 8 is a schematic illustration of DESASS 101 in a deployment phase in which DESASS 101 is ejected from aircraft 103. In an emergency situation, DESASS 101 can be ejected from aircraft 103 in a deployment phase. For example, ejection mechanism 397 can eject DESASS 101 from aircraft 103 while a length of tow cable 109 is uncoiled from tow cable drum 399. DESASS 101 can be designed to perform a safe deployment from aircraft 103, including a safe ejection from aircraft 103 and a safe uncoiling of tow cable 109 so as to avoid damaging DESASS 101 and/or aircraft 103.

In some examples in deployment phase tail surfaces 116 are extended for stabilizing DESASS 101. As an example, propeller 117 can be operated as well to provide wind-powered electrical charging to DESASS 101. In deployment phase DESASS 101 can remain operatively connected to the systems of aircraft 103 and continue to collect situation awareness data.

Referring back to FIG. 6A, operation can further include the step of executing 205 a tow phase, Executing a tow phase can include controlling (609) the towing of a deployable device, and initiating (611) transmission of situation awareness data.

DESASS 101 can be towed by aircraft 103, until the generation or receipt of a release request, for example, an internal request generated after one or more release conditions for releasing DESASS 101 are met or an external request generated by an authorized external source (e.g., the crew, ATC, or the company). Alternatively, DESASS 101 can be released immediately from aircraft 103 without being towed.

While executing tow phase, DESASS 101 can be towed at a predetermined distance from aircraft 103 to optimize desired operation of DESASS 101, similar to what was described above in relation to the deployment phase. The towing of DESASS 101 can be controlled by a tow control module of emergency control unit 310. For example, the tow control module can be configured to operate towing mechanism 409 (e.g. a winch connected to tow cable 109) utilized for towing DESASS 101 by aircraft 103. For example, the tow control module can control towing mechanism 409 to adjust the length of tow cable 109 to optimize the distance of DESASS 101 from aircraft 103 while DESASS 101 is in tow phase. While in tow phase tow cable 109 can be kept taut between DESASS 101 and aircraft 103.

While DESASS 101 is in tow phase emergency control unit 310 can continue to collect situation awareness data dependently and/or independently of aircraft 103. For example, DESASS 101 can continue to monitor aircraft 103 by a two-way or one-way data link with aircraft 103 e.g. via communication lines integrated inside tow cable 109 or over a wireless communication link (e.g. via Wi-Fi) providing two-way communication between DESASS 101 and aircraft 103. The two-way data link between DESASS 101 and aircraft 103 can be for example over a local area network (LAN).

While in tow phase DESASS 101 can be configured to operate various systems configured for collecting situation awareness data externally from the aircraft. DESASS 101 can use a data acquisition device for collecting situation awareness data. The data acquisition device can be any such suitable device configured to acquire situation awareness data, for example: payload 315, air-data sensor 301, and/or altitude measurement instrument 305. Payload 315 can include: electro-optics (EO) and infrared (IR) cameras configured for day and night conditions, synthetic aperture radar (SAR) configured for all weather conditions, or any other type of appropriate sensor or camera. The situation awareness data can include data indicative of the movement and location of aircraft 103. As such, DESASS 101 can be further configured to operate payload 315 for monitoring the carrier aircraft 103 visually.

In tow phase DESASS 101 can be for example positioned at a distance from aircraft 103 so that the wake of aircraft 103 will have a negligible effect on any sensor readings of DESASS 101. Notably, a portion of the situation awareness data determined by DESASS 101 in tow phase cannot be determined by a conventional black box located internally inside the aircraft.

Executing tow phase can include initiating transmission of situation awareness data. The situation awareness data can be transmitted to any appropriate destination using any appropriate method. Some examples are described below.

In some case while DESASS 101 is executing tow phase, emergency control unit 310 can transmit situation awareness data including position indication to another control station or device via a line-of-sight (LOS) or beyond-line-of-sight (BLOS) communication link. For example, DESASS 101 can transmit situation awareness data to a ground control station (via a LOS communication link).

Figure 14:
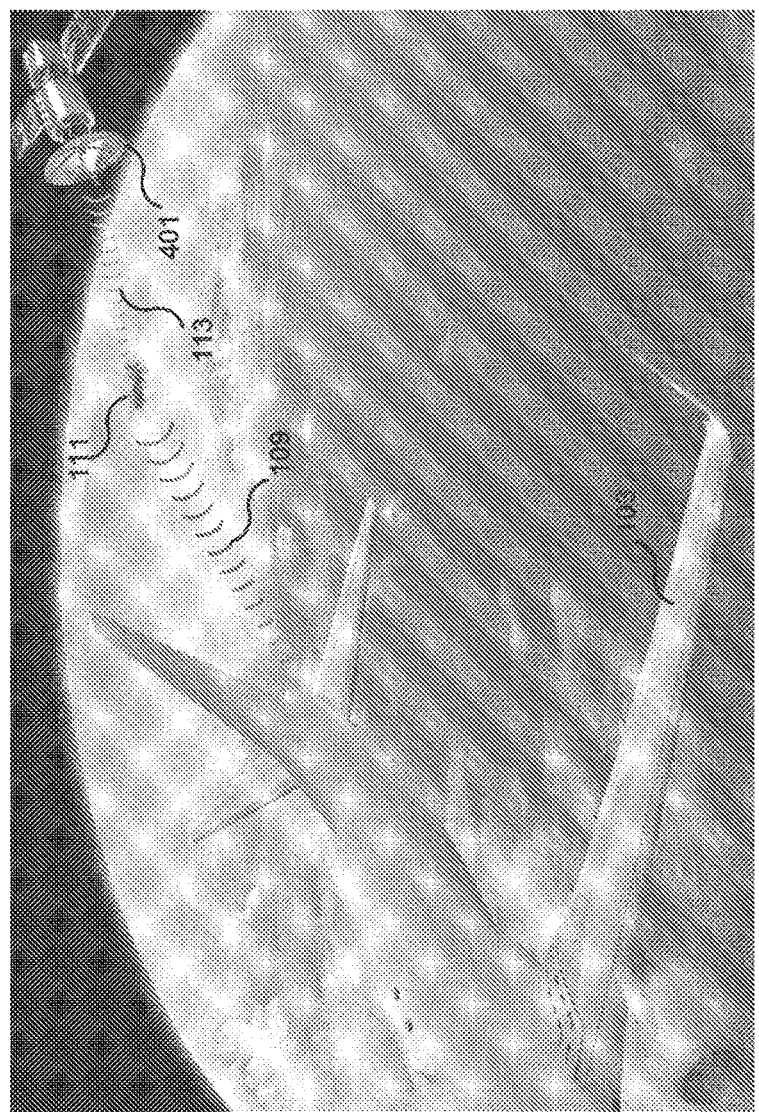

Alternatively, DESASS 101 can transmit situation awareness data via satellite 401 to a ground control station (via a BLOS communication link). DESASS 101 can transmit situation awareness data to satellite 401 using antenna 111 (e.g. a SATCOM antenna) to form communication link 113, as illustrated in FIG. 14.

Further alternatively, DESASS 101 can transmit situation awareness data to aircraft 103 or to another aircraft (not shown). For example DESASS 101 can transmit situation awareness data to aircraft 103 via a communication cable incorporated within tow cable 109. Alternatively, the communication link between DESASS 101 and aircraft 103 can be a wireless communication link.

DESASS 101 can also be configured to receive commands from a control station, e.g. a command requesting for certain data or a command for controlling a camera to collect images, for example, live footage in the vicinity of DESASS 101.

Emergency control unit 310 can be configured to send all or part of the stored collected situation awareness data periodically or continuously e.g. via SATCOM to a predetermined site. Emergency control unit 310 can send or broadcast stored collected situation awareness data to the pilots via the aircraft avionics system in an emergency situation. For example, the video signal from payload 315 can be transmitted to a display unit viewable to a pilot of the carrier vehicle.

DESASS 101 can provide real time damage assessment and situational awareness onboard aircraft 103. DESASS 101 can provide photos or videos to help the pilots better assess the situation they are in. For example, images of the damaged area of the aircraft can help the pilot to evaluate the damage to aircraft 103 and help the pilot to determine the best course of action. While executing tow phase DESASS 101 can view at least part of aircraft 103. In some examples, DESASS 101 will be able to view substantially the entire airframe of aircraft 103.

In some examples, DESASS 101 will be configured to take into account at least some of the maneuvers performed by aircraft 103, and perform the necessary adjustments to continue monitoring substantially the entire airframe of aircraft 103.

DESASS 101 can function as an independent situation awareness data sensing system. DESASS 101 can provide information that is obtained externally from the internal systems of aircraft 103. Situation awareness data can be independently sampled and transformed into avionics signals within the towed DESASS 101. The situation awareness data can be transmitted back to the aircraft avionics system or to a separate dedicated system or monitor onboard aircraft 103. Optionally, if the internal systems of aircraft 103 malfunctions, a swift deployment of DESASS 101 in tow phase can serve as an independent source of critical situation awareness data such as air data, navigation data and external situational data for the pilot.

As DESASS 101 operates independently of aircraft 103, DESASS 101 can also identify and provide information from an external point of view, with respect to the internal systems of aircraft 103.

For example, if one or more internal systems of aircraft 103 fail and are providing conflicting information, DESASS 101 can provide a clearer picture of the situation by providing additional, possibly more accurate, data to resolve conflicts in the data.

In another example, in a case where the landing gear indications in the aircraft 103 show complete or partial malfunction of the landing gear, the true situation of the landing gear may still remain unknown to the crew. DESASS 101 can provide information collected externally to the aircraft which indicates the true situation of the landing gear.

DESASS 101 can serve to communicate with air traffic control in case aircraft 103 fails to do so. If an emergency arises, the relevant situation awareness data can be made immediately available to air traffic control, e.g. via uplink communication with satellite 401.

Figure 9:
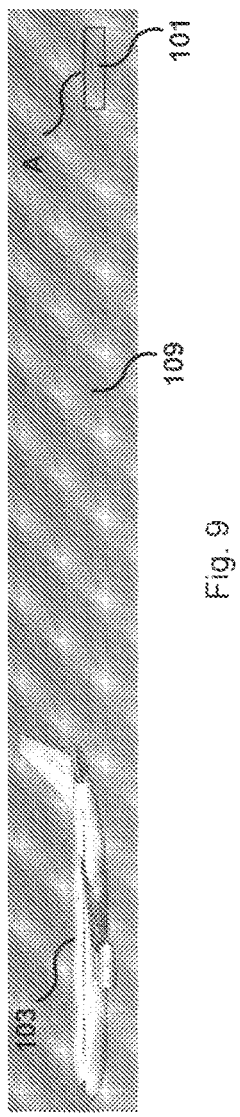
FIGS. 9-11 are schematic illustrations of the DESASS in tow phase, in accordance with an example of the presently disclosed subject matter.
Figure 10:
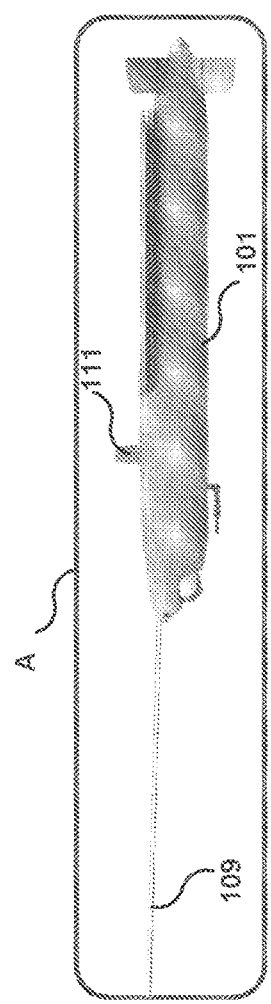
Figure 11:
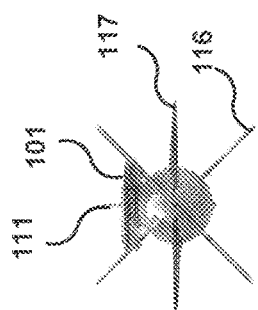

Attention is now drawn to FIGS. 9-11, FIGS. 9-11 are schematic illustrations of DESASS 101 in a tow phase in which the DESASS is towed by aircraft 103.

In some examples, while executing tow phase, wings 115 can remain in a retracted position, and tail surfaces 116 and propeller 117 can be in extended positions, as illustrated in FIG. 11. In some examples while DESASS 101 is in tow phase the rotation of propeller 117 by wind forces can cause the electrical charging of power source 309 of DESASS 101.

The extension and retraction of the various parts of DESASS 101 can depend on the scenario. As an example, a decision to extend or retract the various parts of DESASS 101 can be made by the emergency control unit. The decision can be made based on one or more extension/retraction conditions sensed by DESASS 101. For example, an extension/retraction condition can be based on data indicative of one or more environmental conditions surrounding DESASS 101, e.g. airspeed and altitude conditions. Alternatively, extension/retraction can be controlled by an external source.

As described above, in tow phase DESASS 101 can remain operatively connected to the systems of aircraft 103 and continue to gather situation awareness data. A portion of the collected situation awareness data can be obtained independently from aircraft 103. Payload 315 can capture additional visual situation awareness data, such as images (including video) of aircraft 103. Collected situation awareness data can be transmitted via a communication link to any appropriate destination. As an example, DESASS 110 can transmit the location of DESASS 101 as determined by a GPS unit of DESASS 110.

Referring back to FIG. 6A, the operation can further include executing 207 a separation phase. Executing a separation phase can include responding (613) to a release request, and separating (615) the deployable device from the carrier.

Responding (613) to a release request can follow the preliminary detecting of a release condition and generating of a release request, or the receiving of a release request from an external source.

Responsive to a release request, either an internal request generated after detection (e.g. by emergency control unit 310) that one or more release conditions for releasing DESASS 101 from being towed are met or an external request generated by an authorized external source (e.g., the crew, ATC, or the company), DESASS 101 is released from being towed. In some cases, an external request can require additional verification and/or validation. In some cases a combination of conditions can be required to activate release of DESASS 101.

Release conditions can be based, for example, on indications that aircraft 103 is going to stop flying and crash within a certain period of time. Release conditions can be based, for example, on collected situation awareness data. The situation awareness data can include various parameters indicative of the fly-ability of aircraft 103. Release conditions can be based on, for example: altitude of aircraft 103 (e.g. a low altitude, below a certain predefined minimal threshold value per geographical position), trajectory of aircraft 103, velocity of aircraft 103, the glide ratio of aircraft 103, the distance of aircraft 103 from the ground, and/or airliner deterioration or disintegration as sensed by the reduction or loss of tension in towing cable 109.

Release can occur automatically based on a decision made by the emergency control unit in response to a received or calculated release condition. For example, if it is determined by the emergency control unit that aircraft 103 is going to crash within a certain period of time, then a release request signal can be generated for causing a release mechanism 387 to release DESASS 101 from being towed.

For example, a release module 329 of emergency control unit 310 can be connected to various sensors providing situation awareness data which is processed by the release module for determining whether release conditions for activating release are met. Emergency control unit 310 can be configured to detect certain release conditions. In one example release module 329 can detect when aircraft 103 is no longer able to continue flying and is about to go down and release DESASS 101 from being towed. In another example, a sensor of DESASS 101 can sense situation awareness data that emergency control unit 310 uses to detect a release condition. In yet a another example, the sensed situation awareness data is used by emergency control unit 310 to determine that aircraft 103 is likely to crash within a certain amount of time.

For example, a velocity threshold of aircraft 103 for releasing the DESASS can be predefined as a velocity which is sufficiently low to allow the much smaller DESASS 101 smooth transition into independent flight. In other examples, the DESASS can be built to withstand the full airspeed envelope of the carrier aircraft while being towed.

The release module of emergency control unit 310 can generate a signal instructing a release mechanism 387 to activate release of DESASS 101 when one or more of these predefined release conditions are detected. As mentioned above, any type of suitable release mechanism 387 can be used to detach DESASS 101 from tow cable 109.

In some examples the pilot or crew can be allowed to eject DESASS 101 into deployment phase but are not given the capability to release DESASS 101 from the tow cable. In some examples the pilot or crew can also be restricted from manually ejecting DESASS 101 into deployment phase. For example, the restriction can be based on certain conditions or thresholds, such as the altitude of aircraft 103. For example, the crew can be restricted from releasing DESASS 101 while aircraft 103 is below the minimum safe DESASS ejection altitude, e.g. during normal takeoff and landing procedures.

In some cases the ejection and/or release of DESASS 101 from aircraft 103 can depend on an external enabling signal generated by an authorized external source (e.g., ATC or the carrier aircraft's operating company).

Similar to an ejection request, a release request can include parameters such as instructions of tasks for DESASS 101 to perform (optionally including a destination for DESASS 101), the source of the request, and validation/authorization credentials.

In some cases a single request signal can be generated and/or received instructing both ejection and release. An ejection and release request can be an internal request generated upon detection of one or more emergency and/or release conditions, or an external request generated and transmitted by an authorized external source. In this case, responsive to the ejection and release request signal, DESASS 101 can be immediately released from tow cable 109 right after safe ejection from aircraft 103 has been completed.

DESASS 101 can also be configured to be returned to aircraft 103 based on an internal or external return request. The coiling and uncoiling of tow cable 109 can be controlled by internal or external sources.

For example, under certain circumstances, a deployed DESASS 101 can be reeled back inside aircraft 103 for the remaining duration of the flight. For example, if the flight crew experienced an in-flight emergency during which DESASS 101 was deployed, e.g., in tow mode, and subsequently the crew was able to recover from the emergency, a return request can be generated to reel DESASS 101 back to aircraft 103.

Similar to release of DESASS 101, in some examples the pilot or crew can be restricted from returning DESASS 101. In some cases the return of DESASS 101 to aircraft 103 can depend on an external enabling signal generated by an authorized external source (e.g., ATC or the carrier aircraft's operating company).

An internal return request can be generated upon detection of certain predefined return conditions. For example, the emergency condition is no longer relevant.

Figure 12:
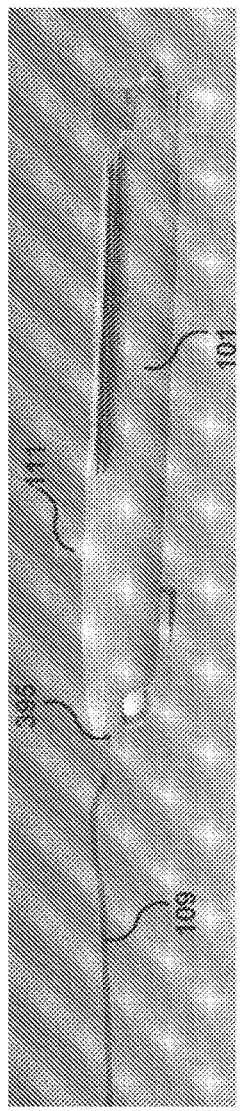
FIG. 12 is a schematic illustration of the DESASS in separation phase, in accordance with an example of the presently disclosed subject matter.

Attention is now drawn to FIG. 12. FIG. 12 is a schematic illustration of the DESASS 101 in a separation phase in which DESASS 101 is released from aircraft 103. DESASS 101 can be designed to perform a safe separation from aircraft 103, including a safe release of DESASS 101 from aircraft 103 so as to avoid damaging DESASS 101 and/or aircraft 103.

DESASS 101 can execute separation phase once a release condition is detected. Cable release mechanism 387 releases tow cable 109 from attachment points 395.

When executing separation phase, DESASS 101 disengages from tow cable 109. This disengagement can cause DESASS 101 to be physically disconnected from the systems of aircraft 101.

As mentioned above, the coiling and uncoiling of tow cable 109 can be controlled by internal or external sources. For example, if aircraft 103 intends to initiate a normal landing procedure after DESASS 101 has been released from tow cable 109, then tow cable 109 can be reeled back into its inboard cable drum 399 inside aircraft 103 (based on an internal or external request to do so), thereby facilitating a safe landing of aircraft 103 by preventing whiplash hazards potentially caused by a loosely towed cable.

Referring now to FIG. 6B, the operation can further include executing 209 a detached phase. Executing a detached phase includes transitioning (617) the deployable device to a travel configuration and operating (619) the deployable device after detachment. Executing 209 a detached phase can also include executing 211 a tracking sub-phase and executing 213 a loitering sub-phase, described in further detail below. In some examples, the operations of the deployable device after detachment can be fully or partially autonomous.

Upon release of DESASS 101 from being towed, DESASS 101 transitions from separation phase and enters into a detached phase.

When transitioning into detached phase, a flight module of emergency control unit 310 can be configured to activate transition of DESASS 101 from a tow configuration to a flight configuration. An autopilot or flight control device can be activated to control flight of DESASS 101. For example, wings 115 of DESASS 101 can be opened or spread out into an extended position and engine 367 and propeller 117 of DESASS 101 can begin operating. Alternatively, DESASS 101 can transit into a flight configuration or at least begin the process of transitioning into a flight configuration before DESASS 101 is released. In such cases, DESASS 101 can be capable of flying immediately upon release.

In detached phase DESASS 101 can continue to collect and transmit situation awareness data including position data, and in some cases a visual and/or audio signal, as described above in relation to the other phases of DESASS 101.

When executing detached phase DESASS 101 can travel independently of aircraft 103. The flight path of DESASS 101 can be in a specific flight pattern, e.g. as determined by the autopilot or flight control module of emergency control unit 310, or based on received instructions.

In some cases DESASS 101 is configured to fly towards a predetermined destination. In some cases DESASS 101 is configured to fly responsive to received instructions sent from an operator.

DESASS 101 has the ability to fly around, below or above aircraft 103 and provide images thereof. For example if the damage to aircraft 103 is in the dorsal part of aircraft 103, DESASS 101 can elevate to an altitude higher than the altitude of aircraft 103 and provide images of that part of aircraft 103. An operator can communicate with DESASS 101 and request for an image from a certain angle.

Referring back to FIG. 6B, executing 209 a detached phase can include, in some examples, executing 211 a tracking sub-phase. Executing a tracking sub-phase includes tracking (621) the carrier.

When executing tracking sub-phase the flight path can be generated for the DESASS 101 to travel behind aircraft 103, i.e. trailing aircraft 103.

Figure 13:
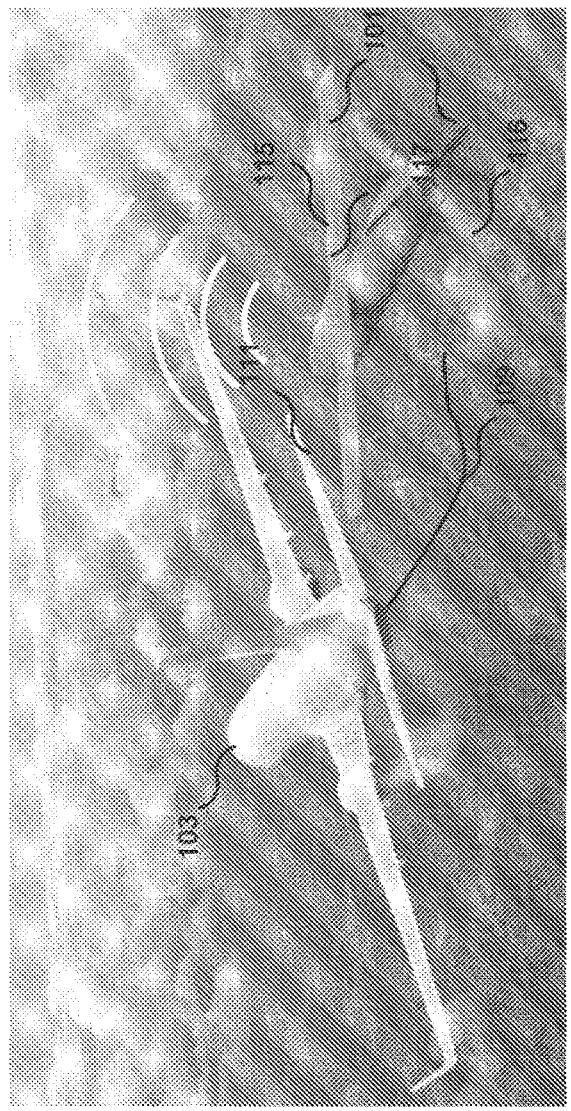
FIGS. 13-15 are schematic illustrations of the DESASS in tracking phase, in accordance with an example of the presently disclosed subject matter.
Figure 15:
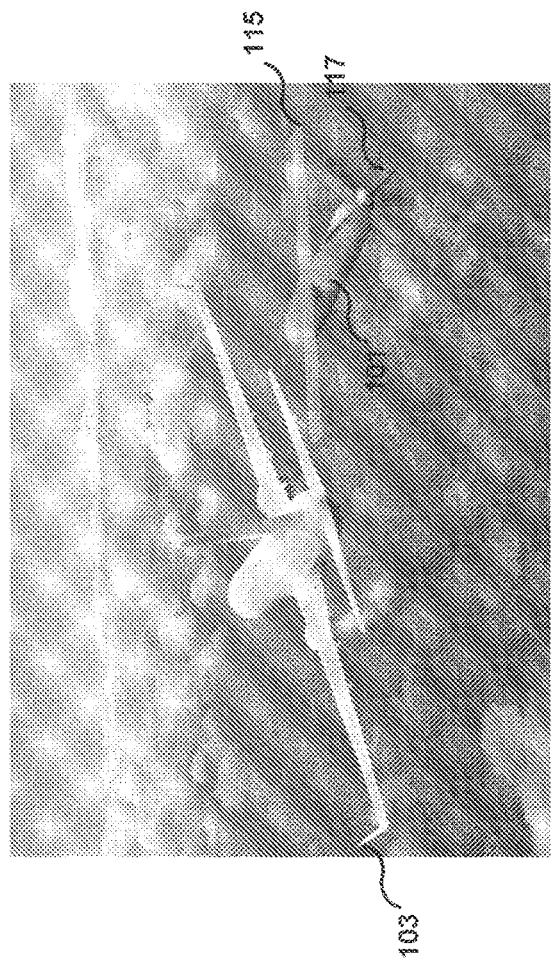

Attention is now drawn to FIGS. 13-15. FIGS. 13-15 are schematic illustrations of DESASS 101 in a tracking sub-phase of the detached phase.

In tracking sub-phase DESASS 101 can track aircraft 103. For example, DESASS 101 can use homing device 389 to track a homing beacon on aircraft 103. In tracking sub-phase DESASS 101 can fly while tracking the path of aircraft 103. As stated above, in tracking sub-phase, DESASS 101 can continue to collect and transmit situation awareness data. The situation awareness data can include location data or other data to be used to locate and/or assist aircraft 103.

In some cases, where aircraft 103 has crashed, DESASS 101 can track aircraft 103 in tracking sub-phase until DESASS 101 reaches the crash site. As an example, once DESASS 101 reaches the crash site it can switch into a loitering sub-phase.

Referring back to FIG. 6B, executing 209 a detached phase can include, in some examples, executing 211 a loitering sub-phase. Executing a loitering sub-phase includes initiating (623) collection of crash site data and initiating (625) transmission of crash site data.

For example, when executing loitering sub-phase the flight pattern can be in a circle around a crash site of aircraft 103 or around the point of release of DESASS 101 from aircraft 103.

Executing loitering sub-phase can include initiating (623) collection of crash site data. Crash site data can include images (e.g., photographs or video) of the crash site taken using cameras (e.g. video) or sensors (e.g. IR). Crash site data can also include temperature data of the crash site.

DESASS 101 can provide crash site data and situation awareness data to ground authorities even after loss of contact with aircraft 103. Crash site data and situation awareness data can help shorten response time of authorities. Crash site data can provide information that can be used to determine the location of the crash site. For example, crash site data can be used to determine if aircraft 103 is on land or in water, whether any survivors are in the vicinity of aircraft 103 on land or in water, and/or whether aircraft 103 or the wreckage of aircraft 103 is on fire.

Crash site data and situation awareness data can also allow rescuers to adequately prepare to locate, extract and treat wounded survivors. Crash site data can help a rescue team prepare properly for the conditions of the crash site, and provide data which can be helpful in performing the rescue.

Figure 18:
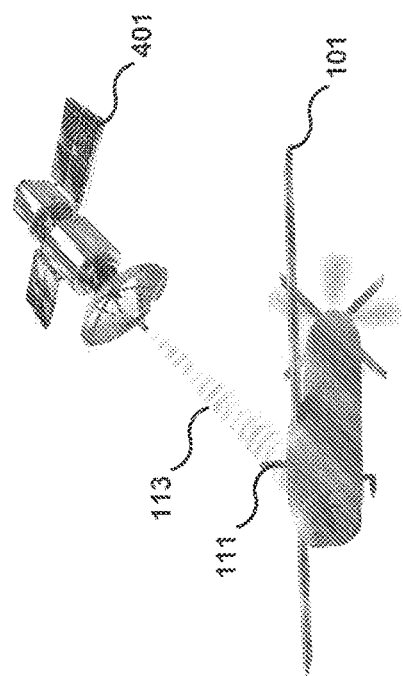

Executing loitering sub-phase can also include initiating transmission of crash site data, DESASS 101 transmits data e.g. situation awareness data and/or crash site data. As illustrated in FIG. 18 the situation awareness data can be transmitted e.g. via antenna 111 to satellite 401 over LOS and BLOS communication link 113. Satellite 401 can transmit the situation awareness data to air traffic control. Situation awareness data can help in the location or tracking of missing or damaged aircraft 103.

Furthermore, situation awareness data obtained by DESASS 101 can also provide indications of design flaws or dormant failures that endanger other active aircraft in the same fleet as aircraft 103. For example if the situation awareness data indicates that the engine of aircraft 103 is the part that malfunctioned, then the engines of the other active aircraft in the same fleet as aircraft 103 can be inspected. Relatively quick access to the situation awareness data facilitates investigation towards the root cause of an incident or accident. In cases where a dormant failure is suspected in the fleet of aircraft to which aircraft 103 belongs, a relatively quick resolution to this investigation can mitigate the time the appropriate measures are taken (e.g. grounding the entire fleet).

The collecting and transmitting of crash site data and situation awareness data can be controlled by emergency control unit 310. As mentioned above, the collection and transmission of situation awareness data can be performed by DESASS 101 in any of the various phases.

Figure 16:
FIGS. 16-18 are schematic illustrations of the DESASS in loitering phase, in accordance with an example of the presently disclosed subject matter.
Figure 17:

Attention is now drawn to FIGS. 16-18. FIGS. 16-18 are schematic illustrations of DESASS 101 in a loitering sub-phase of detached phase.

In some cases, in loitering sub-phase DESASS 101 can fly above the crash site of aircraft 103 while surveying the impact zone from the air. As an example, in loitering sub-phase DESASS 101 can fly in a predetermined flight pattern maintaining a relatively consistent location.

As stated above, in loitering sub-phase, DESASS 101 can continue to collect and transmit situation awareness data including position data. The situation awareness data can include crash site data to be used by emergency responders. Examples of crash site data are provided above.

Referring back to FIG. 6B, in some examples the operation can further include executing 215 a recovery phase. Recovery phase can include responding (627) to a landing request and landing (629) the deployable device.

Responding (627) to a landing request can follow the preliminary detecting of a landing condition and generating of a landing request, or the receiving of a landing request from an external source.

As an example, DESASS 101 executes safe recovery phase responsive to a landing request, either an internal request generated upon detection of one or more landing conditions or an external request generated by an authorized external source (e.g. another vehicle, the crew, ATC, or company). In some cases, an external landing request can require additional verification and/or validation.

For example, DESASS 101 can be configured to sense when DESASS 101 is at low power and prepare to land. Alternatively, landing can occur for other reasons based on other landing conditions even when power is full. For example, a landing condition can be DESASS 101 entering a certain predetermined location as sensed by GPS 303. As another example, the landing condition can be DESASS 101 receiving a command instructing to land from a remote operator.

For example, the immediate landing (and transition into rest phase) of DESASS 101 might be crucial to clear the airspace in the vicinity of the crash site, e.g., to allow the safe approach of rescue helicopters. In other cases, immediate landing of DESASS 101 might be crucial for the conservation of electrical power, e.g., in order to retain a relatively long data transmission window if DESASS 101 is currently located over the middle of an ocean.

Similar to an ejection/release request, a landing request can include parameters such as instructions of tasks for DESASS 101 to perform (optionally including a landing destination for DESASS 101), the source of the request, and validation/authorization credentials.

Figure 19:
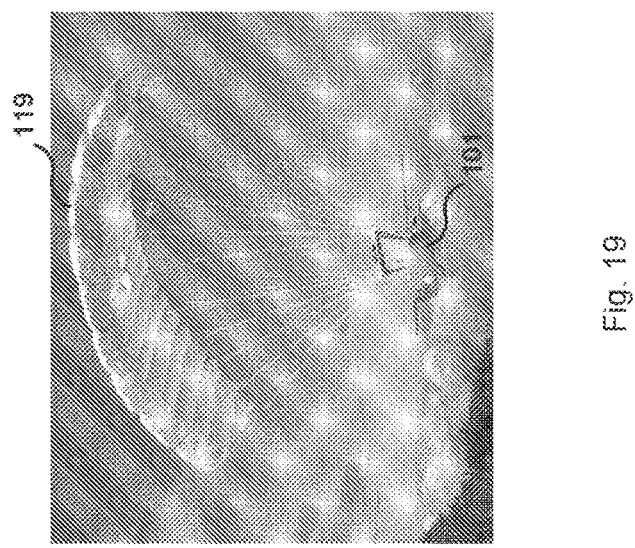
FIG. 19 is a schematic illustration of the DESASS in recovery phase, in accordance with an example of the presently disclosed subject matter.

FIG. 19 is a schematic illustration of DESASS 101 in a safe recovery phase. In safe recovery phase DESASS 101 can perform operations to allow DESASS 101 to be recovered. For example, DESASS 101 can deploy parachute 119 from recovery parachute housing 383 to enable safe descent of DESASS 101 from the air.

As an example, DESASS 101 can include a landing mechanism configured to land DESASS 101, For example, the landing mechanism can include parachute 119 to assist in the landing, floatation device 121 to help prevent DESASS 101 from sinking, and/or a fully or partially autonomous landing system for landing DESASS 101 on a surface. For example, the landing system can control the operation of an airbag, landing skids, a landing gear and/or wheels.

Referring back to FIG. 6B, in some examples the operation can further include executing 217 a rest phase. Executing a rest phase can include maintaining (627) continued operation of the deployable device. After DESASS 101 has landed, DESASS 101 can continue to operate in a rest phase.

Figure 20:
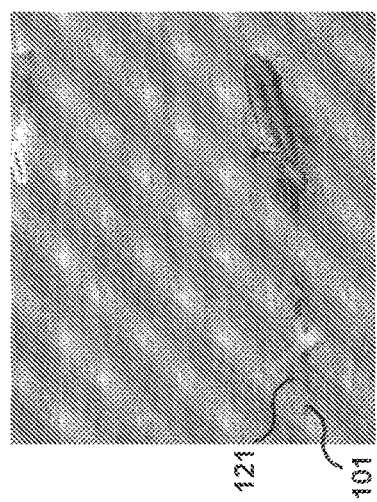
FIG. 20 is a schematic illustration of the DESASS in rest phase, in accordance with an example of the presently disclosed subject matter.

FIG. 20 is a schematic illustration of the DESASS 101 in a rest phase. As illustrated in FIG. 20, DESASS 101 can be configured to float or can include deployable floatation device 121 in case DESASS 101 landing occurs on water.

In rest phase DESASS 101 can continue to collect and transmit situation awareness data, crash site data, and/or location data. For example, in rest phase DESASS 101 can transmit location data to the appropriate authorities using an emergency homing beacon or transmit FDR or CVR data acquired from the carrier aircraft during the ill-fated flight.

Notably, operations (601) and (611) are given as examples of initiating the collection and transmission of situation awareness data. Alternatively, the initiation can occur during other phases. In any case, the collection and transmission of situation awareness data can be performed continuously or periodically at any appropriate time (e.g. before or after ejection, before or after release, before or after landing, etc.) while DESASS 101 is in any one of the various phases of operation. For example, DESASS 101 can be configured to collect and/or transmit situation awareness data after landing while in a rest phase as illustrated in FIG. 20. For example, while in rest phase DESASS 101 can continue to capture images of the surroundings of DESASS 101.

DESASS 101 can also include an emergency beacon or other transmitter that transmits the location of DESASS 101 before or after landing. The emergency beacon can assist in locating DESASS 101.

At least a portion of DESASS 101 can be designed and constructed to withstand trauma, for example the force of a high speed impact or the heat of an intense fire. Certain parts of DESASS 101, such as those storing data, can be reinforced and protected by resilient material (e.g. strong corrosion-resistant stainless steel or titanium, and high-temperature insulation) so as to protect those systems in case of impact (e.g. due to landing) or fire in a manner similar to the methods and techniques used to protect conventional flight recorders.

Attention is now drawn to FIG. 21. FIG. 21 is a functional block diagram schematically illustrating an emergency control unit 310, in accordance with the presently disclosed subject matter.

Emergency control unit 310 is a device comprising one or more processing units each comprising in turn one or more computer processors operatively connected to a computer memory (including non-transitory computer memory).

Emergency control unit 310 is suitably mounted on DESASS 101 and is operatively connectable to various devices and subsystems of aircraft 103 e.g. aircraft systems 251, aircraft data-repository or memory 253, aircraft black box flight data recorder (FDR) 255, aircraft black box cockpit voice recorder (CVR) 257, a display unit or monitor 259 located in the cockpit or cabin onboard aircraft 103, a homing beacon 261, and an interface port 501.

DESASS 101 can operate in addition to or instead of a conventional black box of aircraft 103. As an example, aircraft systems 251 can include emergency instruments, display units, or an Engine-Indicating and Crew-Alerting System (EICAS). One example of an interface between DESASS 101 and aircraft 103 is described further below with reference to FIG. 23.

Emergency control unit 310 is configured to control operations of DESASS 101 in an emergency situation, such as in the event of engine failure of aircraft 103, to enable DESASS 101 to collect and transmit data and travel independently.

Emergency control unit 310 can be fully automated, but in some implementations it can also react to commands/requests issued by an operator. For example, responsive to a command, emergency control unit 310 can terminate its autonomous control of DESASS 101, and be controlled by another system or by a human operator.

Emergency control unit 310 comprises at least one processing unit 320 operatively connectable to aircraft 103 and DESASS 101. Each processing unit comprises or is operatively connected to one or more computer processors and computer memory (volatile and non-volatile). Processing unit 320 can be configured to collect various situation awareness data determined by sensors of DESASS 101 or determined by aircraft 103, for example: data indicative of airspeed of aircraft 103 determined by aircraft 103 or DESASS 101; data indicative of airspeed of DESASS 101 determined for example by DESASS 101 with the help of air-data sensor 301 (e.g. a pitot tube); data indicative of position and heading of DESASS 101 determined by a navigation assisting device such as a Global Positioning System (GPS) receiver 303 and an Inertial Navigation System (INS) (not shown); data indicative of current altitude of DESASS 101 determined by DESASS systems such as altitude measurement instrument 305. Altitude measurement instrument 305 can be implemented, for example, as a pressure altimeter, a sonic altimeter, a radio altimeter, a GPS based altimeter, and so forth.

It is noted that emergency control unit 310 can be further configured to collect additional information including situation awareness data of different kinds indicative of flight and state of DESASS 101 and/or aircraft 103. It is noted that the list above is given by way of non-limiting example only and emergency control unit 310 can be operatively connected to additional types of input interfaces and/or various devices in addition to those specified above. For example emergency control unit 310 can also be operatively connected to other systems of DESASS 101 such as communication unit 313, one or more payloads 315, manual controls 317 (e.g. to control ejection and release of DESASS 101), data-repository 371, flight data recorder (FDR) 373, homing device 389, and interface port 503.

Processing unit 320 can comprise, for example, the following modules:
  Data gathering module 321 configured to collect information as described above with reference to operations (601) and (621) in FIGS. 6A-6B. According to one example, data gathering module 321 can be configured to collect information from external sources (e.g. aircraft data-repository 253) as well as internal sources (e.g. air-data sensor 301). Data gathering module 321 can be configured to continuously operate during normal operation of aircraft 103 to collect and provide real-time information. Data gathering module 321 can be operatively connected to the various sensors and/or units from which, or by which, the information is gathered. The gathered situation awareness data can be displayed for example on a dedicated display unit or monitor 259 of aircraft 103. The gathered situation awareness data can be based, inter alia, on information received from the various onboard devices and input interfaces of aircraft 103 or systems of DESASS 101. For example, current residual fuel level from fuel level indicator 307, residual power from power source 309 (e.g. a battery, which can be solar powered), current position from GPS 303, altitude from altitude measurement instrument 305, and airspeed velocity from air-data sensor 301. Based on this information, additional relevant data can be determined such as an emergency condition and/or release condition. The determined emergency condition and/or release condition can affect operation of DESASS 101. The determined/detected emergency condition and/or release condition can cause a module of the emergency control unit 310 to generate a signal, e.g., an ejection and/or release request, as described below. The generated signal can cause the ejection and/or release of DESASS 101.

Data gathering module 321 can also be configured to store data on systems such as data-repository 371 or FDR 373. Data gathering module 321 is configured to allow DESASS 101 to gather and store situation awareness data (e.g. black box FDR and CVR information of aircraft 103).

Ejection module 323 configured to make a determination or decision to eject DESASS 101 based on one or more emergency conditions or a user indication as described above with reference to operation (603) in FIG. 6A. Ejection module 323 can generate an ejection request and/or an instruction for controlling the ejection mechanism 397 for ejecting DESASS 101.

Tow control module 325 configured to control the towing of DESASS 101 when DESASS 101 is in tow phase as described above with reference to operation (605) of FIG. 6A. Tow control module 325 can generate for example instructions to a towing mechanism 409 (e.g. a winch controlling the length of tow cable 109 that is uncoiled from cable drum 399) for controlling the distance of DESASS 101 from aircraft 103 or the strain on the towing cable.

Data transmission module 327 configured to transmit gathered data as described above with reference to operations (611) and (627) of FIGS. 6A-6B. Data transmission module 327 can for example transmit situation awareness data within line-of-sight (LOS) and beyond-line of sight (BLOS).

Release module 329 configured to make a determination or decision to release DESASS 101 based on one or more release conditions or a user indication as described above with reference to operation (603) of FIG. 6A. Release module 329 can generate a release request and/or an instruction for controlling the release mechanism for releasing DESASS 101 from being towed.

Autopilot/flight control module 331 configured to control the transition of DESASS 101 to detached phase and to control the travel of DESASS 101 while in detached phase as described above with reference to operations (617) and (619) of FIG. 6B. Autopilot/flight control module 331 can be activated when DESASS 101 is in tow phase before DESASS 101 is completely detached from aircraft 103. In tow phase, autopilot/flight control module 331 can help stabilize DESASS 101. In tow phase and detached phase, autopilot/flight control module 331 can enable DESASS 101 to maneuver above, below or aside the carrier aircraft if a specific observation angle is desired. Autopilot/flight control module 331 can be configured to provide instructions to navigation and landing module 333, for example for guiding DESASS 101 to enter a specific flight path or descending spiral in response to a landing condition, as described above with reference to operations (627) and (629) of FIG. 6B.

Navigation and landing module 333 configured to control DESASS 101 in order to maintain the course of DESASS 101 along a desired flight path and to control DESASS 101 during a landing procedure. The flight path can be a predetermined path or a flight path determined in real-time. The flight path can be for example a path circling around the point of release of DESASS 101 or following a signal sent from a homing beacon of aircraft 103, e.g. leading DESASS 101 towards a crash site. The flight path can be towards a certain destination stored for example in data-repository 371 or provided in real-time from a control station. The flight path can also be a landing approach generated responsive to loss of power of DESASS 101. Navigation and landing module 333 is configured to generate instructions to operation control unit 350.

Operation control unit 350 can be configured to control various devices such as: antenna 111, wings 115, propeller 117, parachute 119, flotation device 121, rudder 361, flaps 363, wheels 365, engine 367 (e.g. an electric motor), emergency beacon 375 (e.g. an underwater locator beacon), landing gear 377 and others 379 (e.g. ailerons, elevators, etc). Landing can be determined with the help of navigation assisting devices such as a GPS receiver 303 and altitude measurement instrument 305 operating on DESASS 101. Landing can be performed automatically using a landing mechanism including a landing system, landing skids, an airbag, landing gear 377 and/or wheels 365 for landing DESASS 101 on the ground. A landing control unit can be operatively connected to the landing mechanism. The control unit is configured to detect one or more landing conditions and generate a landing request and/or instructions to activate the landing mechanism for landing DESASS 101.

As mentioned above, in some examples the various decisions and functions can be distributed. For example, not all of the decisions have to be made by emergency control unit 310 on DESASS 101. Some decisions can be made by DESASS 101 and some can be made by carrier vehicle 103.

Figure 22:
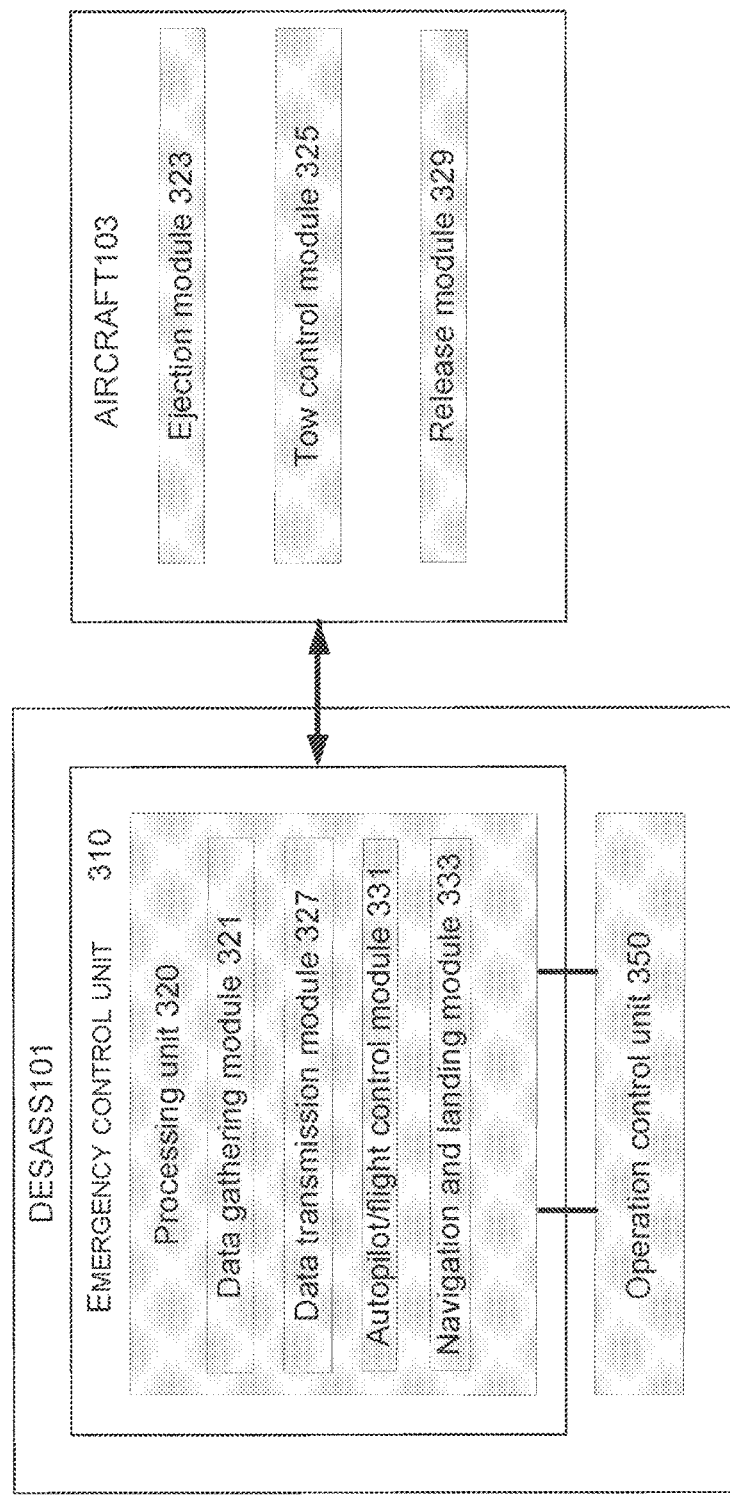
FIG. 22 is a functional block diagram schematically illustrating a DESASS, in accordance with an example of the presently disclosed subject matter.

Also mentioned above, in some examples various elements and modules can be located either on aircraft 103 or DESASS 101. In some examples, some elements located on aircraft 103 will remain on aircraft 103 when DESASS 101 is ejected. One example of such a distribution is illustrated in FIG. 22. It will be appreciated that countless varieties of distributions are possible. For example, towing mechanism 409 can be located on DESASS 101. Or, release mechanism 387, ejection module 323, tow control module 325, and/or release module 329 can be located on aircraft 103.

Figure 23:
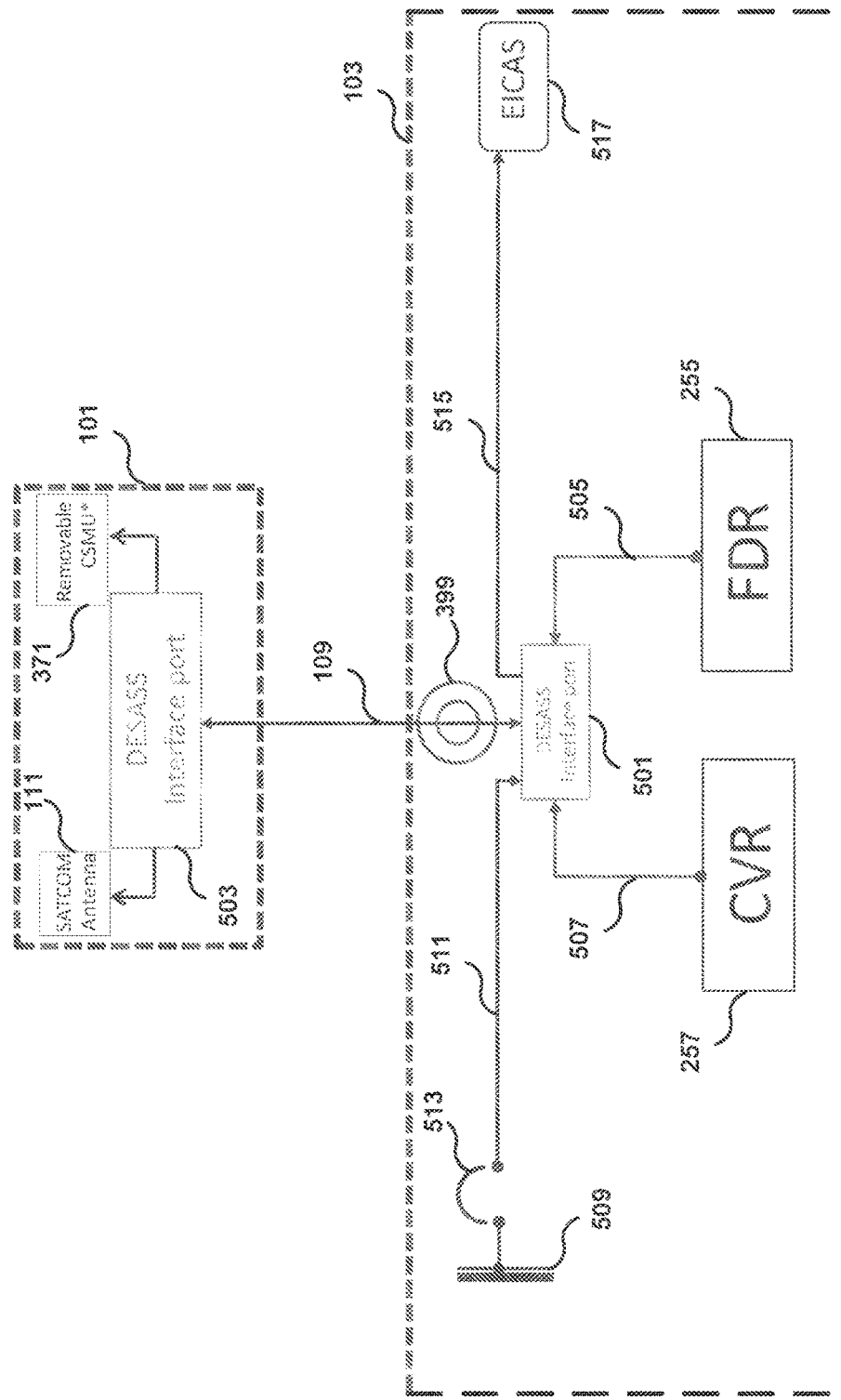
FIG. 23 is a functional block diagram schematically illustrating the interface between the DESASS and an aircraft, in accordance with an example of the presently disclosed subject matter.

Attention is now drawn to FIG. 23. FIG. 23 is a functional block diagram schematically illustrating the interface between DESASS 101 and the aircraft 103.

Interface port 503 on DESASS 101 is operatively connected to interface port 501 on aircraft 103. For example, Interface port 503 can be connected to interface port 501 via a cable. The cable can be a wired tow cable 109 that is removably coiled around cable drum 399. As another example, interface port 503 can be connected to interface port 501 via wireless communication or IR communication.

Interface port 501 receives input from aircraft FDR 255 and aircraft CVR 257. For example, input 505 can be an FDR input and input 507 can be an audio input. DESASS 101 can receive the input received at interface port 501 via wired tow cable 109 connected to interface port 503. DESASS 101 can store those inputs as data in data-repository 371. DESASS 101 can transmit those inputs as data via one or more antennas. For example, antenna 111 or SATCOM antenna 391.

Interface port 501 receives input from a power source 509 of aircraft 103 via power feed 511. Circuit breaker 513 can be provided on power feed 511 to protect aircraft 103 and/or DESASS 101. For example, circuit breaker 513 can protect from a power surge. DESASS 101 can receive the power input via wired tow cable 109.

Interface port 501 has an output. For example, a visual output 515 can be operatively connected to EICAS 517. As another example, visual output 515 can be operatively connected to another monitor 597. DESASS 101 can send output back to the aircraft via wired tow cable 109 or by using wireless communication. This output can be situation awareness data obtained by DESASS 101 and stored in data-repository 371.

The presently disclosed subject matter contemplates, inter alia, a system, a method and a computer program product of deploying and operating a DESASS. The disclosed subject matter can be used for example for enabling a vehicle in an emergency situation to release a DESASS.

It is to be understood that the system according to the presently disclosed subject matter includes a suitably programmed computer. Likewise, the presently disclosed subject matter contemplates a non-transitory computer program being readable by a computer for executing the method of the presently disclosed subject matter. The presently disclosed subject matter further contemplates a machine-readable memory (transitory and non-transitory) tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other examples and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A deployable device being mountable on a carrier aircraft and configured to collect situation awareness data with respect to the carrier aircraft, the deployable device comprising:

at least one recorder device configured to collect situation awareness data;

the deployable device is capable of being ejected from the carrier aircraft, responsive to an ejection request;

wherein the deployable device is configured as an aerial vehicle comprising a control unit configured to control the deployable device after being ejected; and the deployable device is further configured, after being ejected from the carrier aircraft to:

continue collection of situation awareness data with respect to the carrier aircraft; and following crashing of the carrier aircraft at a crash site, to fly to the crash site and collect the situation awareness data with respect to the carrier aircraft and/or the crash site, while flying in the vicinity of the crash site.

2. The deployable device of claim 1, wherein the control unit is configured following ejecting of the deployable device to control the maneuvering of the vehicle to enable collection of situation awareness data with respect to the carrier aircraft from a desired observation angle.

3. The deployable device of claim 1, is configured as an deployable unmanned aerial vehicle (UAV) stored onboard the carrier aircraft capable of flying independently from the aircraft following ejection.

4. The deployable device of claim 3, further comprising wings situated in retracted position while the deployable device is onboard the carrier aircraft; the deployable device is configured to extend the wings after ejection and release from the carrier aircraft.

5. The deployable device of claim 1, further comprising means for propelling the deployable device including one or more of: an engine and a propeller.

6. The deployable device of claim 1, wherein the control unit is configured to direct the flight of the deployable device along a flight path; wherein the flight path of the deployable device includes one or more of: a flight path intended for tracking the flight path of the carrier aircraft; and a flight path around a crash site of the carrier aircraft.

7. The deployable device of claim 1, further comprising an emergency control unit operatively connected to an ejection mechanism; wherein the emergency control unit is configured to generate an instruction for activating the ejection mechanism configured to eject the deployable device from the carrier aircraft, responsive to the ejection request.

8. The deployable device of claim 7, wherein the emergency control unit remains mounted to the carrier aircraft after ejection of the deployable device from the carrier aircraft.

9. The deployable device of claim 1, further comprising a landing control unit operatively connected to a landing mechanism; wherein the landing control unit is configured to generate an instruction to activate the landing mechanism for landing the deployable device, responsive to a landing request.

10. The deployable device of claim 9, wherein the deployable device is configured to collect and/or transmit situation awareness data after landing.

11. The deployable device of claim 1, further comprising at least one data acquisition device for acquiring situation awareness data including one or more of: a payload; an air-data sensor; global positioning system unit; data communication unit; and an altitude measurement instrument.

12. The deployable device of claim 1, further comprising a data transmission module configured to transmit the situation awareness data after ejection.

13. The deployable device of claim 1, further comprising at least one camera for capturing images in the vicinity of the deployable device.

14. The deployable device of claim 1, further comprising a computer storage configured to store the collected situation awareness data.

15. The deployable device of claim 1, wherein the deployable device is connectable by a towing mechanism to the carrier aircraft and configured upon ejection from the carrier aircraft to be towed by the towing mechanism of the carrier aircraft and continue collection of situation awareness data with respect to the carrier aircraft while being towed, and
wherein the control unit is configured to maneuver the deployable device while being towed to enable collection of situation awareness data with respect to the carrier aircraft from a desired observation angle.

16. The deployable device of claim 15, further comprising a release module operatively connected to a release mechanism; wherein the release module is configured to generate an instruction to the release mechanism to release the deployable device from being towed by the carrier aircraft, responsive to the release request.

17. A method comprising:
operating a deployable device mounted onboard a carrier aircraft, the deployable device being configured to collect situation awareness data, the operating comprising:
operating at least one recorder device onboard the deployable device for collecting situation awareness data with respect to the carrier aircraft;
ejecting the deployable device from the carrier aircraft;
upon ejection:
operating the deployable device as an aerial vehicle;
collecting situation awareness data with respect to the carrier aircraft by the deployable device; and
following crashing of the carrier aircraft at a crash site, flying to the crash site, and collecting the situation awareness data with respect to the carrier aircraft and/or the crash site, while flying in the vicinity of the crash site.

18. The method of claim 17, further comprising:
following ejection, towing the deployable device by the carrier aircraft;
while the deployable device is being towed:
continuing collection of situation awareness data with respect to the carrier aircraft, by the deployable device after ejection; and
maneuvering the vehicle to enable collection of situation awareness data with respect to the carrier aircraft from a desired observation angle with respect to the carrier aircraft; and
releasing the deployable device from the carrier aircraft, responsive to a release request;
upon release, maneuvering the deployable device while in the air to enable collection of situation awareness data with respect to the carrier aircraft from a desired observation angle.

19. The method of claim 17, further comprising:
controlling flight of the deployable device along a flight path; wherein the flight path of the deployable device includes one or more of: a flight path intended for tracking the flight path of the carrier aircraft; and a flight path around a crash site of the carrier aircraft.

20. The method of claim 17, further comprising:
following ejecting the deployable device from the carrier aircraft towing the deployable device and while towing, maneuvering the deployable device to enable collection of situation awareness data with respect to the carrier aircraft from a desired observation angle with respect to the carrier aircraft.

21. The method of claim 17, further comprising:
landing the deployable device, responsive to a landing request.

22. The method of claim 21, further comprising continuing to collect and/or transmit situation awareness data with respect to the aircraft and/or crash site following landing in the vicinity of the crash site.

23. A system for collecting situation awareness data of a carrier aircraft, the system comprising:
a deployable device configured to collect situation awareness data;
an ejection sub-system including an ejection module and an ejection mechanism configured to eject the deployable device from the carrier aircraft, responsive to an ejection request; and
wherein the deployable device is configured as an aerial vehicle; the deployable device is further configured to continue collection of situation awareness data with respect to the carrier vehicle after being ejected,
wherein the deployable device comprises a control unit configured to control the maneuvering of the deployable device to enable collection of situation awareness data with respect to the carrier aircraft from a desired observation angle with respect to the carrier aircraft,
wherein the deployable device further comprises a propelling device configured, following crashing of the carrier aircraft at a crash site, to fly to the crash site and collect the situation awareness data with respect to the carrier aircraft and/or the crash site, while flying in the vicinity of the crash site.

24. The system of claim 23, further comprising:
a towing sub-system including a tow control module and a towing mechanism configured to control the towing of the deployable device by the carrier aircraft after ejection; and
a release sub-system mechanism including a release module and a release mechanism configured to release the deployable device from being towed by the carrier aircraft, responsive to a release request.

25. A deployable device being mountable on a carrier aircraft and configured to collect situation awareness data, the deployable device comprising:
at least one recorder device configured to collect situation awareness data;
the deployable device is capable of being ejected from the carrier aircraft, responsive to an ejection request;
wherein the deployable device is configured as an aerial vehicle operating independently from the carrier aircraft and comprising a control unit configured to control the aerial vehicle after being ejected;
wherein the deployable device is further configured to continue collection of situation awareness data with respect to the carrier aircraft after being ejected from the carrier aircraft and the control unit is further configured to maneuver the vehicle to enable collection of situation awareness data with respect to the carrier aircraft from a desired observation angle;
wherein the deployable device is configured to following ejection, follow the carrier aircraft and following crashing of the carrier aircraft at a crash site, to fly to the crash site and collect the situation awareness data with respect to the carrier aircraft and/or the crash site, while flying in the vicinity of the crash site.

* * * * *